United States Patent
Otagiri et al.

(10) Patent No.: US 11,533,405 B1
(45) Date of Patent: Dec. 20, 2022

(54) READING DEVICE AND IMAGE FORMING APPARATUS

(71) Applicant: FUJIFILM Business Innovation Corp., Tokyo (JP)

(72) Inventors: Kei Otagiri, Kanagawa (JP); Kei Kobayashi, Kanagawa (JP); Taisuke Endo, Kanagawa (JP); Keigo Shinoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/558,554

(22) Filed: Dec. 21, 2021

(30) Foreign Application Priority Data

Aug. 23, 2021 (JP) .............................. JP2021-135284

(51) Int. Cl.
   *H04N 1/00* (2006.01)
(52) U.S. Cl.
   CPC ..... *H04N 1/00241* (2013.01); *H04N 1/00323* (2013.01); *H04N 2201/0434* (2013.01)
(58) Field of Classification Search
   CPC ........... H04N 1/00241; H04N 1/00323; H04N 2201/0434
   See application file for complete search history.

(56) References Cited

U.S. PATENT DOCUMENTS

| 7,626,634 | B2 * | 12/2009 | Ohki ...................... F16M 11/38 348/207.1 |
| 8,167,441 | B2 * | 5/2012 | Ichieda ................ H04N 9/3105 353/121 |
| 2003/0095200 | A1 * | 5/2003 | Nagano .................. H04N 1/195 348/373 |

FOREIGN PATENT DOCUMENTS

| JP | 2003157432 | 5/2003 |
| JP | 2017175594 | 9/2017 |

\* cited by examiner

*Primary Examiner* — Moustapha Diaby
(74) *Attorney, Agent, or Firm* — JCIPRNET

(57) ABSTRACT

A reading device includes a base on which a read target object is placed, a reader that reads the read target object placed on the base, a first attachment frame to which the reader is attached such that the reader is disposed above the base, an operation unit that is to be operated by a user, a second attachment frame to which a rear surface of the operation unit is attached such that the operation unit is disposed in front of the first attachment frame in a direction toward a front surface of the reading device, and a first cover that covers the second attachment frame. The first cover includes left and right rear cover components that are separately arranged at left and right sides of the first attachment frame serving as a dividing line at the rear surface of the operation unit and that cover at least a portion of the second attachment frame.

19 Claims, 17 Drawing Sheets

READING DEVICE AND IMAGE FORMING APPARATUS

CROSS-REFERENCE TO RELATED APPLICATIONS

This application is based on and claims priority under 35 USC 119 from Japanese Patent Application No. 2021-135284 filed Aug. 23, 2021.

BACKGROUND

(i) Technical Field

The present disclosure relates to reading devices and image forming apparatuses.

(ii) Related Art

Japanese Unexamined Patent Application Publication No. 2003-157432 (paragraph [0038], FIG. 1) describes an imaging apparatus having a document base unit on which a document serving as an imaging target object is placed, an imaging unit, such as a document camera, capturing an image of the document placed on the document base unit, a movable retaining member that retains the imaging unit and is attached to the rear end of the upper surface of the document base unit such that the imaging unit is disposed above the document base unit, and an operation panel disposed at the front end of the upper surface of the document base unit.

Japanese Unexamined Patent Application Publication No. 2017-175594 (paragraph [0034], FIG. 6) describes an image forming apparatus that includes an upward-facing document reading unit having a support pillar and a fastening section that are integrated into a single unit, and a monitor (i.e., screen) provided on a portion of the front surface of the support pillar. The upward-facing document reading unit is detachably secured to the upper surface of the apparatus body by fastening an attachment plate of the fastening section to a fastened section of the apparatus body by using screws.

SUMMARY

Aspects of non-limiting embodiments of the present disclosure relate to a reading device and an image forming apparatus that may prevent at least a portion of a second attachment frame to which the rear surface of an operation unit is attached from being visible from the rear surface of the device or apparatus even if a first attachment frame to which a reader is attached to be disposed above a base on which a read target object is placed exists at the rear surface of the operation unit operable by a user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device including a base on which a read target object is placed, a reader that reads the read target object placed on the base, a first attachment frame to which the reader is attached such that the reader is disposed above the base, an operation unit that is to be operated by a user, a second attachment frame to which a rear surface of the operation unit is attached such that the operation unit is disposed in front of the first attachment frame in a direction toward a front surface of the reading device, and a first cover that covers the second attachment frame, wherein the first cover includes left and right rear cover components that are separately arranged at left and right sides of the first attachment frame serving as a dividing line at the rear surface of the operation unit and that cover at least a portion of the second attachment frame.

BRIEF DESCRIPTION OF THE DRAWINGS

Exemplary embodiments of the present disclosure will be described in detail based on the following figures, wherein.

DETAILED DESCRIPTION

Exemplary embodiments of the disclosure will be described below with reference to the drawings.

First Exemplary Embodiment

Figure 1:
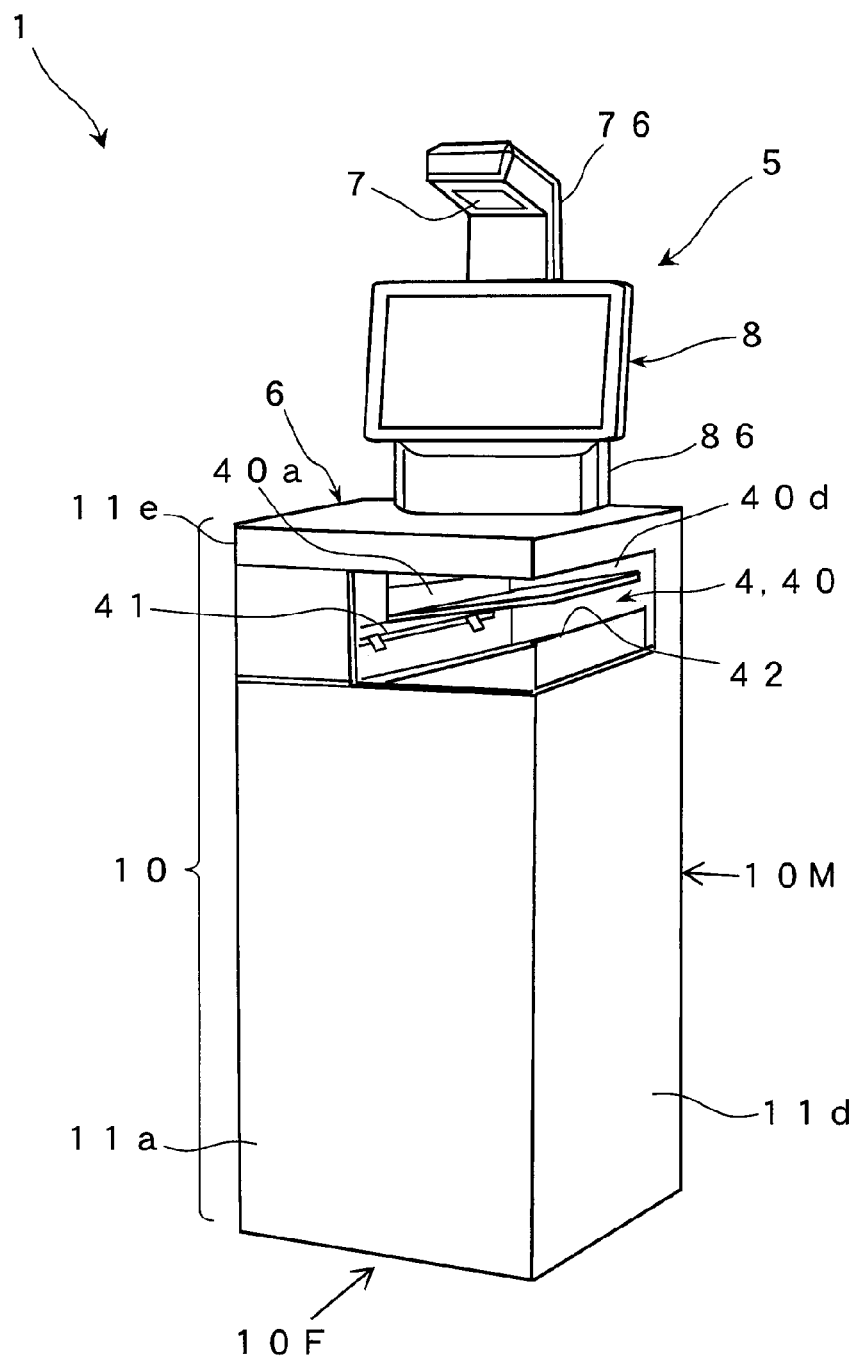
FIG. 1 is a front perspective view of an image forming apparatus according to a first exemplary embodiment.
Figure 1:
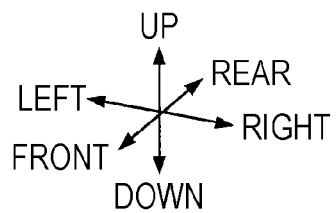
Figure 2:
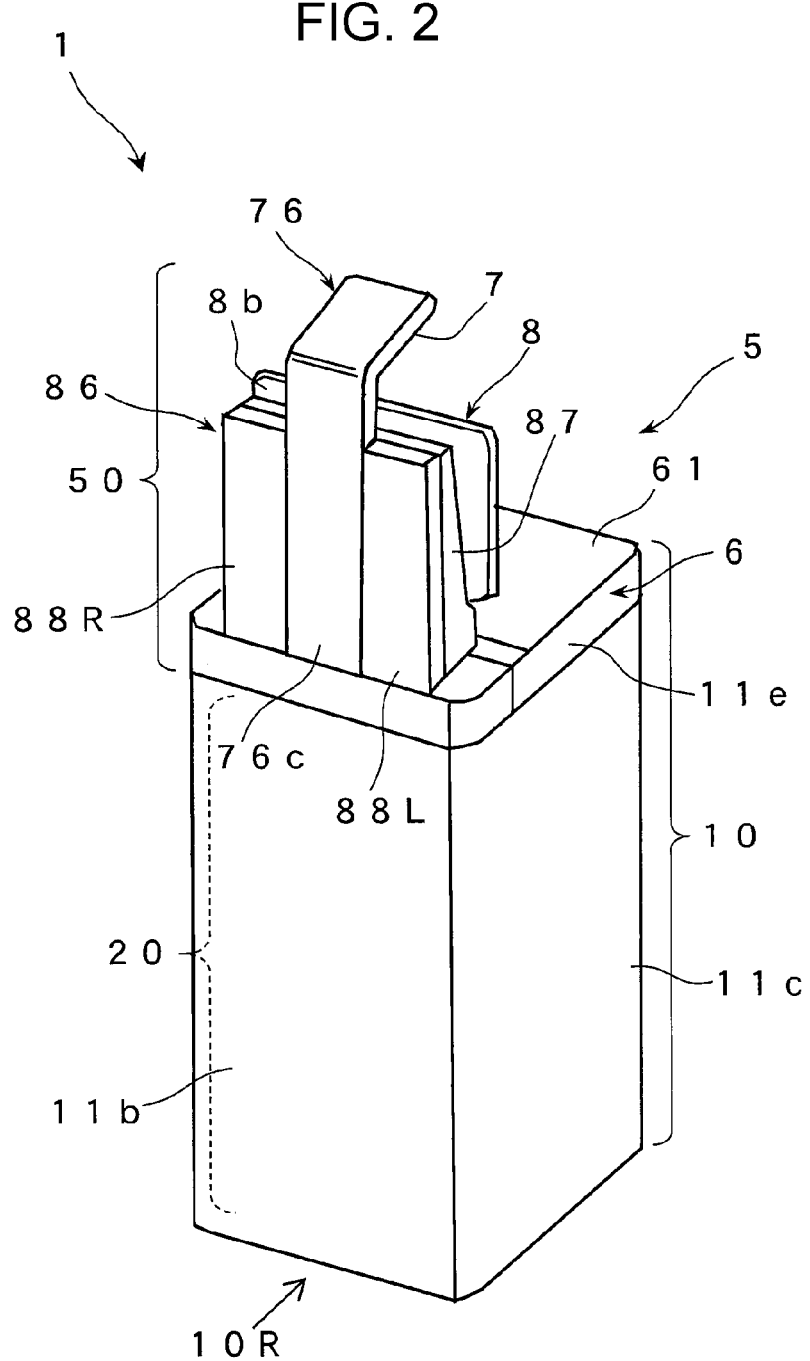
FIG. 2 is a rear perspective view of the image forming apparatus in FIG. 1.
Figure 2:
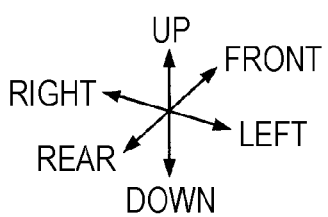
Figure 3:
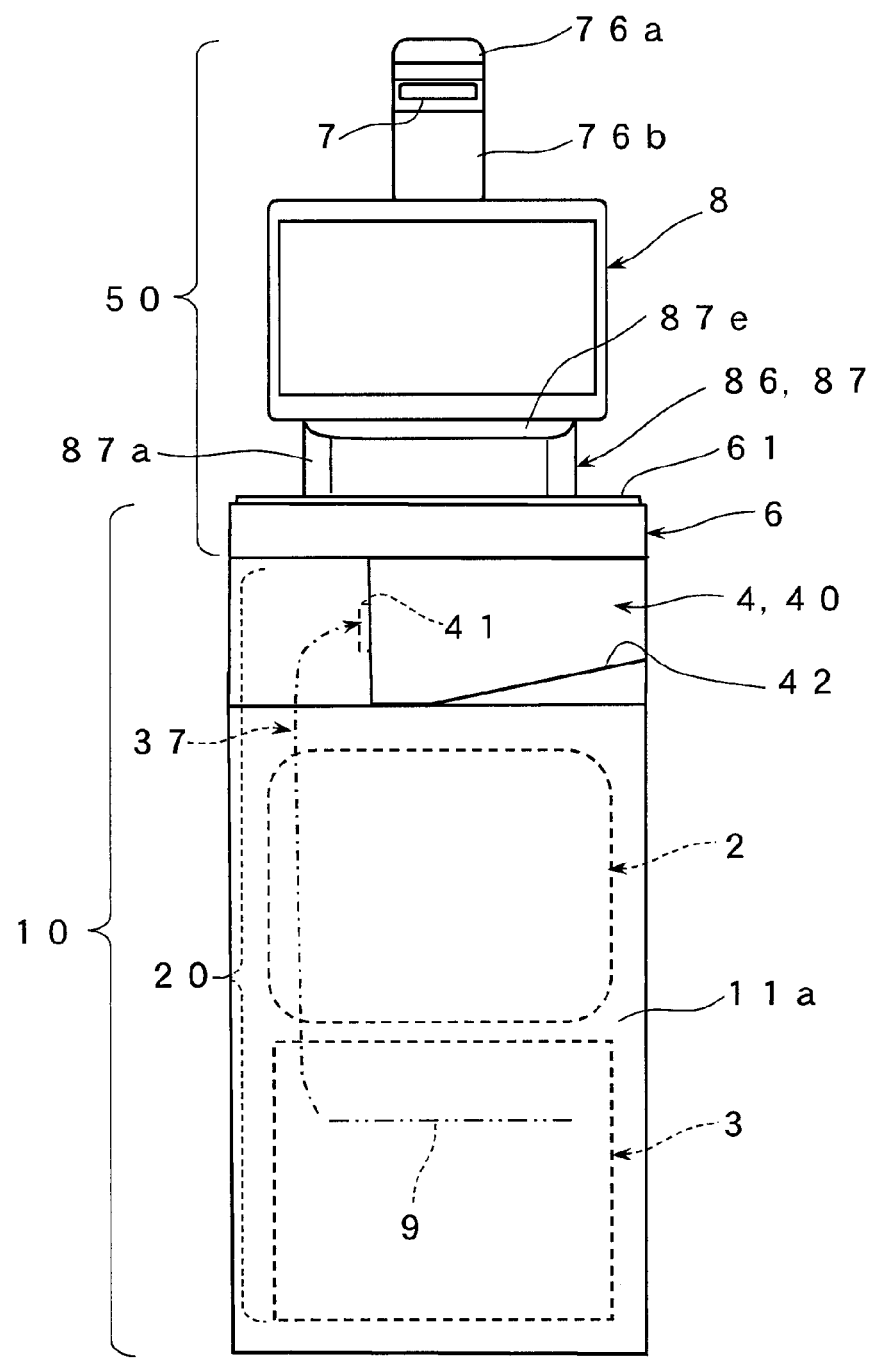
FIG. 3 is a front view schematically illustrating the image forming apparatus in FIG. 1.
Figure 3:
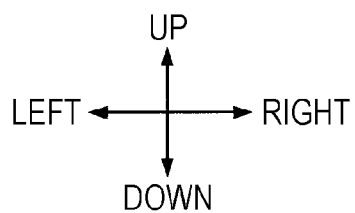

FIGS. 1 and 2 are front and rear external views schematically illustrating an image forming apparatus 1 according to a first exemplary embodiment of the disclosure. FIG. 3 is a front view schematically illustrating the image forming apparatus 1. In the drawings including FIG. 1, up and down directions, left and right directions, and front and rear directions indicated with arrows are directions expressed with reference to a front surface 10F of the image forming apparatus 1, assuming that a user is standing facing the image forming apparatus 1 when using the image forming apparatus 1.

Image Forming Apparatus

As shown in FIGS. 2 and 3, the image forming apparatus 1 according to the first exemplary embodiment includes a housing 10 constituted of an internal framework section and an exterior section, an image forming unit 20 disposed in a lower inner section excluding the upper end of the housing 10, and a reading unit 50 disposed at the upper end of the housing 10.

The housing 10 is a structural body having a predetermined structure and shape and formed of components, such as multiple frames and an external cover.

As shown in FIG. 1, the housing 10 according to the first exemplary embodiment is a rectangular-parallelepiped structural body that is long in the up-down direction.

Figure 6:
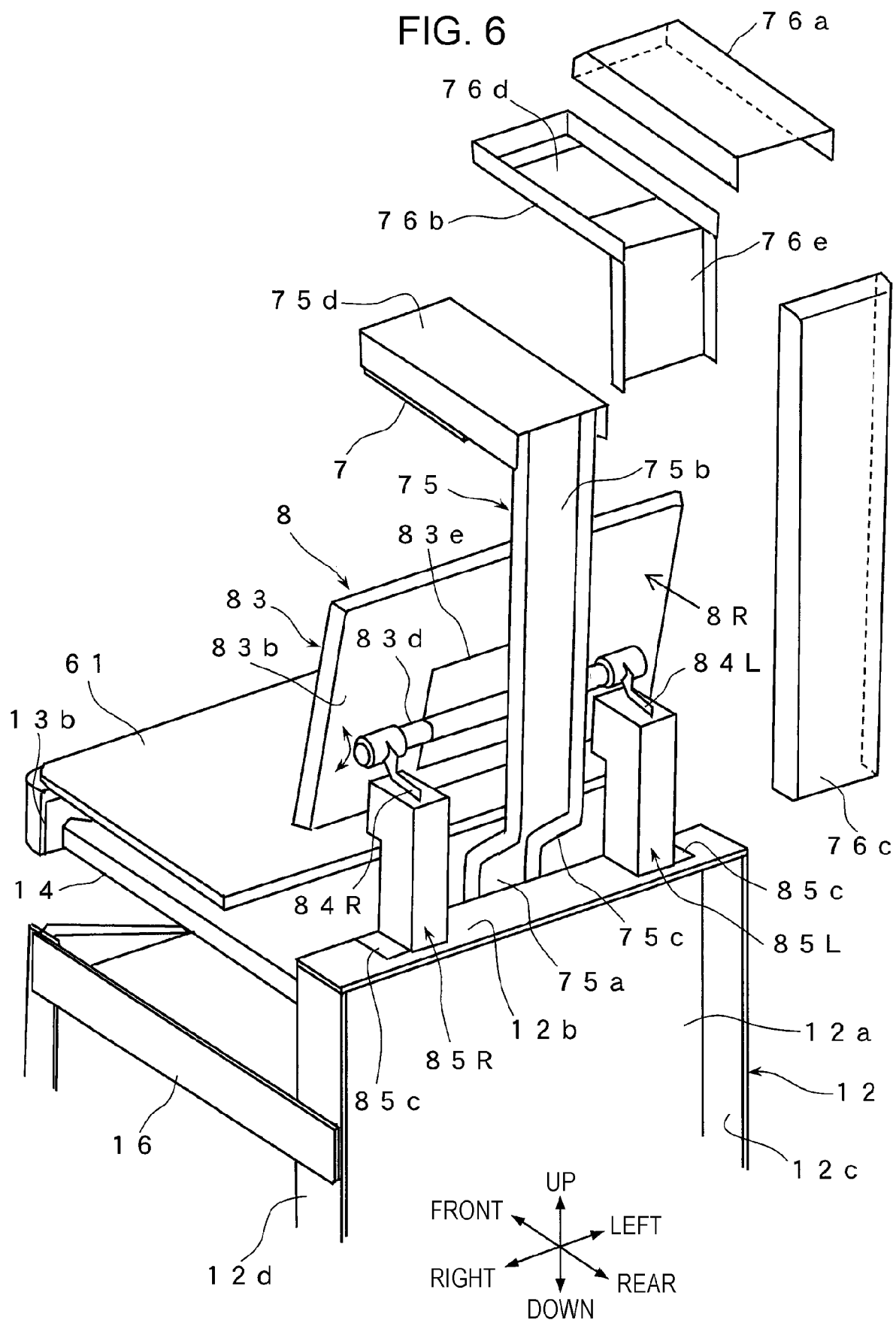
FIG. 6 is a rear perspective view illustrating the reading unit from which a first cover has been removed.
Figure 7:
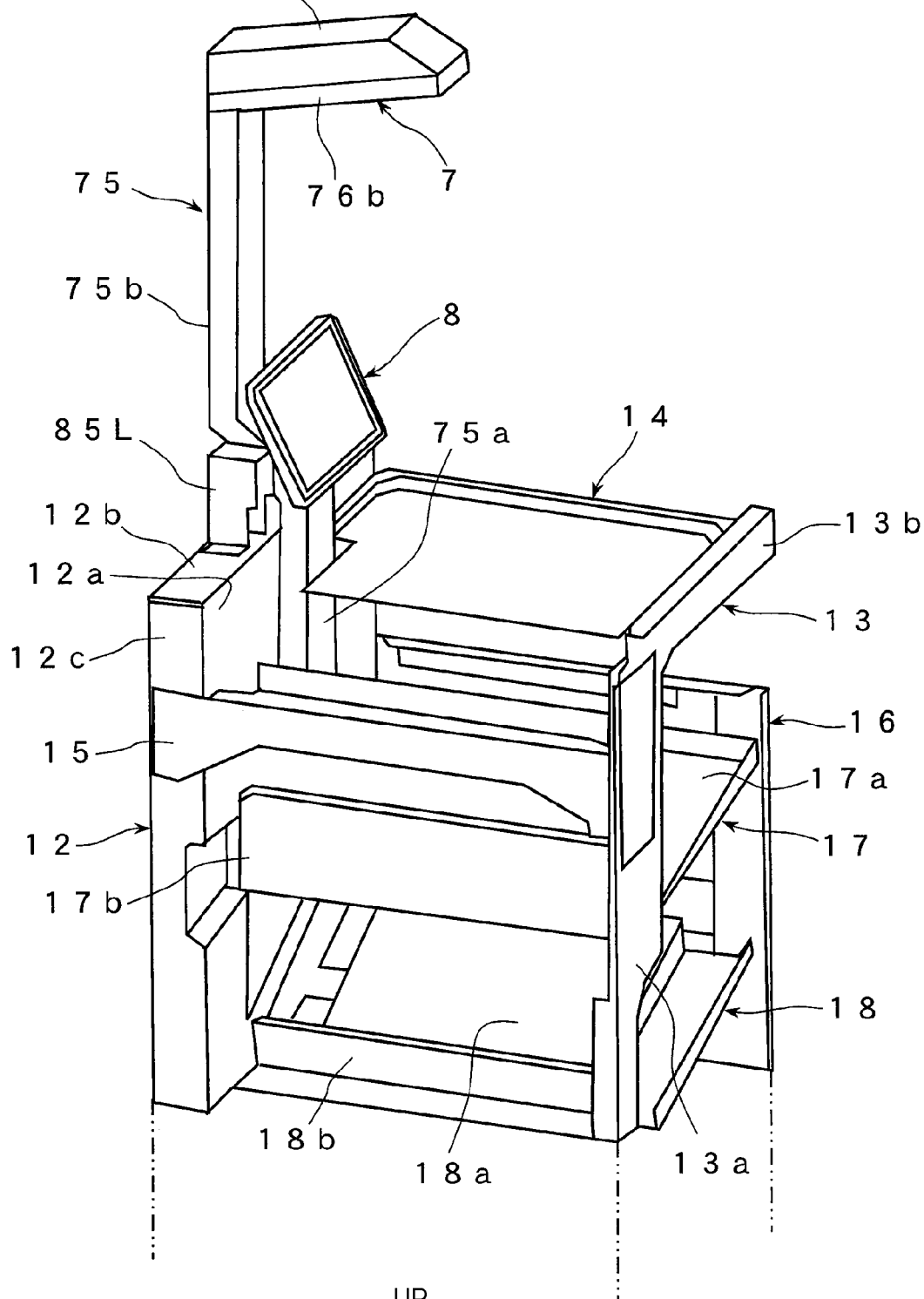
FIG. 7 is a perspective view of a framework section in a part of the reading unit of the image forming apparatus.

As shown in FIGS. 6 and 7, the internal framework section of the housing 10 includes frames, such as a rear frame 12, a front frame 13, an upper frame 14, a left side frame 15, a right side frame 16, and multiple partition frames 17 and 18. Furthermore, as shown in FIGS. 1 and 2, the exterior section of the housing 10 includes external covers, such as a front cover 11a, a rear cover 11b, left and right side covers 11c and 11d, and an upper end cover 11e. At least one of the external covers serves as an open-close cover that is openable and closable.

The image forming unit 20 is configured to form an image corresponding to image information onto a recording medium 9.

As shown in FIG. 3, the image forming unit 20 according to the first exemplary embodiment has an imaging section 2 that creates an image and forms the image on the recording medium 9, a medium feeding section 3 that accommodates the recording medium 9 to be used by the imaging section 2 and feeds the recording medium 9 to the imaging section 2, and a medium output section 4 to which the recording medium 9 having the image formed thereon by the imaging section 2 is output. The recording medium 9 used is, for example, sheet-like plain paper, coated paper, or cardboard having a predetermined size.

The imaging section 2 in the image forming unit 20 is constituted by using an electrophotographic imaging device that ultimately forms an image formed of a developer onto the recording medium 9.

The imaging section 2 constituted of the electrophotographic imaging device includes an image bearing member, such as a photoconductor, devices, such as a charging device, an exposure device, a developing device, and a transfer device, arranged around the image bearing member, and a fixing device disposed at a position located away from the image bearing member. None of the above devices is shown. The imaging section 2 also includes devices, such as a developer supplier, an image processor, and a controller. Of these devices, the transfer device used is a direct transfer device that directly transfers the image formed of the developer formed on the image bearing member onto the recording medium 9 or an intermediate transfer device that transfers the image from the image bearing member onto the recording medium 9 via an intermediate transfer member.

The imaging section 2 has a function of forming an image corresponding to image information input from an external apparatus, such as an information terminal, connected to the image forming apparatus 1 and a function of using information read by the reading unit 50 as image information and forming an image corresponding to the image information.

Thus, the imaging section 2 performs a charging process on the image bearing member in the aforementioned imaging device, and exposure, developing, and transfer processes corresponding to the image information in that order. Consequently, in the imaging section 2, the image formed of the developer is created on the image bearing member, and the image is subsequently transferred onto the recording medium 9 from the image bearing member. Moreover, in the imaging section 2, a fixing process is performed on the recording medium 9 having the image transferred thereon, whereby the image is fixed onto the recording medium 9.

The medium feeding section 3 in the image forming unit 20 is disposed below the imaging section 2. The medium feeding section 3 includes an accommodation member, such as a tray, accommodating the recording medium 9 and a delivery device that delivers the recording medium 9 from the accommodation member. None of these components is shown.

The accommodation member is attached such that an accommodation process for the recording medium 9 is possible by drawing the accommodation member out from inside the housing 10. The accommodation member may be a single accommodation member or multiple accommodation members. Furthermore, the number of delivery devices disposed is equal to the number of accommodation members.

In the medium feeding section 3, a predetermined recording medium 9 is delivered toward the imaging section 2 in accordance with a transfer process in the imaging section 2. In FIG. 3, reference sign 37 denotes a medium transport path along which the recording medium 9 is transported toward an outlet 41 from the medium feeding section 3 via a part of the imaging section 2 (i.e., a part where an image is to be transferred onto the recording medium 9).

The medium output section 4 in the image forming unit 20 is disposed above the imaging section 2. The medium output section 4 has an accommodation space 40 at an upper portion of the front surface 10F of the housing 10. As shown in FIG. 1, the accommodation space 40 is an outward-facing opening space having a front opening 40a offset toward the right and a side opening 40d extending continuously from the front surface 10F to a right side surface 10M.

The medium output section 4 is provided with the outlet 41 for the recording medium 9 at the left inner wall surface of the accommodation space 40. The medium output section 4 is also provided with a load surface 42 at the base of the accommodation space 40. The load surface 42 holds and accommodates the recording medium 9 output from the outlet 41. The load surface 42 is, for example, an inclined surface that increases in height with increasing distance rightward from the outlet 41. In other words, the load surface 42 is a rightward-rising sloped surface.

The recording medium 9 having the image created and fixed thereon in the imaging section 2 is output from the outlet 41 via the medium transport path 37 so as to be accommodated in the medium output section 4.

Reading Unit and Reading Device

As shown in FIGS. 1 to 4, the reading unit 50 is configured to read a read target object 90 (see FIG. 4) placed on a base 6 from above the base 6.

The reading unit 50 is constituted of a reading device 5 including the base 6 on which the read target object 90 is placed, a reader 7 that reads the read target object 90 placed on the base 6, and an operation unit 8 to be touched by the user for operating an apparatus. An operation of an apparatus in the operation unit 8 is an operation of the image forming apparatus 1 including the reading device 5.

The base 6 is formed of a plate-like member having a flat upper surface 61 on which the read target object 90 is placeable in a stationary state. The base 6 is attached to the upper end of the housing 10 such that the upper surface 61 of the base 6 serves as an uppermost surface.

The read target object 90 may be an object that is placeable on the base 6 and readable from above the base 6 by the reader 7. In addition to being a sheet-like document having image information recorded thereon, for example, the read target object 90 may include a three-dimensional object, such as a book or magazine, or a small-sized object, such as a business card, postcard, or card.

The reader 7 is capable of optically reading the read target object 90 placed on the base 6. The reader 7 used is, for example, a camera having a combination of an imaging element, such as a charge-coupled device (CCD), and an optical element, such as a lens. The camera serving as the reader 7 may also be referred to as a document camera. The reader 7 may also be equipped with an illuminator that illuminates the read target object 90 during a reading process.

Figure 5:
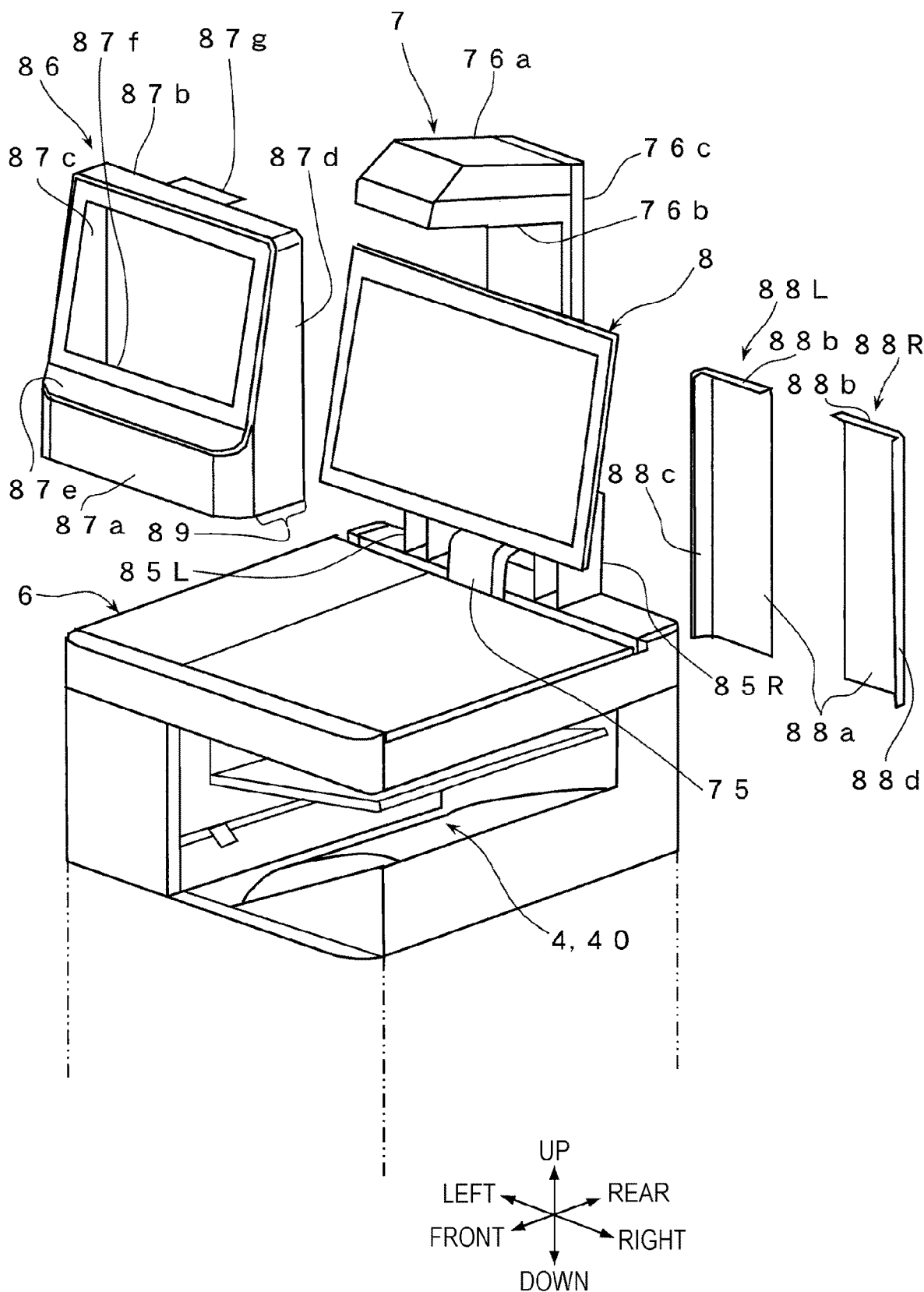
FIG. 5 is a front perspective view illustrating the reading unit from which a second cover has been removed.

As shown in FIG. 5, the reader 7 is attached to a first attachment frame 75 so as to be disposed at a position above the base 6. The first attachment frame 75 is disposed as a frame that extends in the height direction of the image forming apparatus 1 behind the operation unit 8.

A detailed description of the first attachment frame 75 will be provided later.

In addition to using the read information as image information to be transmitted to the image forming unit 20 and to be used as a basis for forming an image, the reader 7 is configured to use the read information as image information to be displayed on a display of the operation unit 8.

The reading device 5 is configured to transmit information read by the reader 7 to an image processor in the image forming unit 20 so that the information is processed. Alternatively, the reading device 5 may include an image processor that performs image processing on the information read by the reader 7.

The operation unit 8 is a plate-like structural body at least having an operation section 81 to be touched by the user for operating the image forming apparatus 1. In addition to the operation section 81, the operation unit 8 may have a display 82 that displays various types of information (such as an image, a video, and so on).

In a case where the operation section 81 has the display 82, the operation section 81 is constituted of a non-mechanical component, such as a touchscreen operable based on, for example, a resistive film method or an electrostatic capacitive method in which current application and positional detection are performed when an area displayed on the display 82 is touched with a finger or a pen. For example, the operation section 81 may be constituted of a mechanical component, such as a physical button or a physical switch operable by being touched and physically moved by the user of the image forming apparatus 1 with a finger. Moreover, the operation section 81 may be constituted of a mixture of the aforementioned non-mechanical component and the aforementioned mechanical component.

The display 82 is constituted of a display device, such as a liquid crystal display panel. In a case where the operation section 81 is constituted of the aforementioned non-mechanical component, the display 82 also displays an operation screen to be used in the operation section 81.

Figure 4:
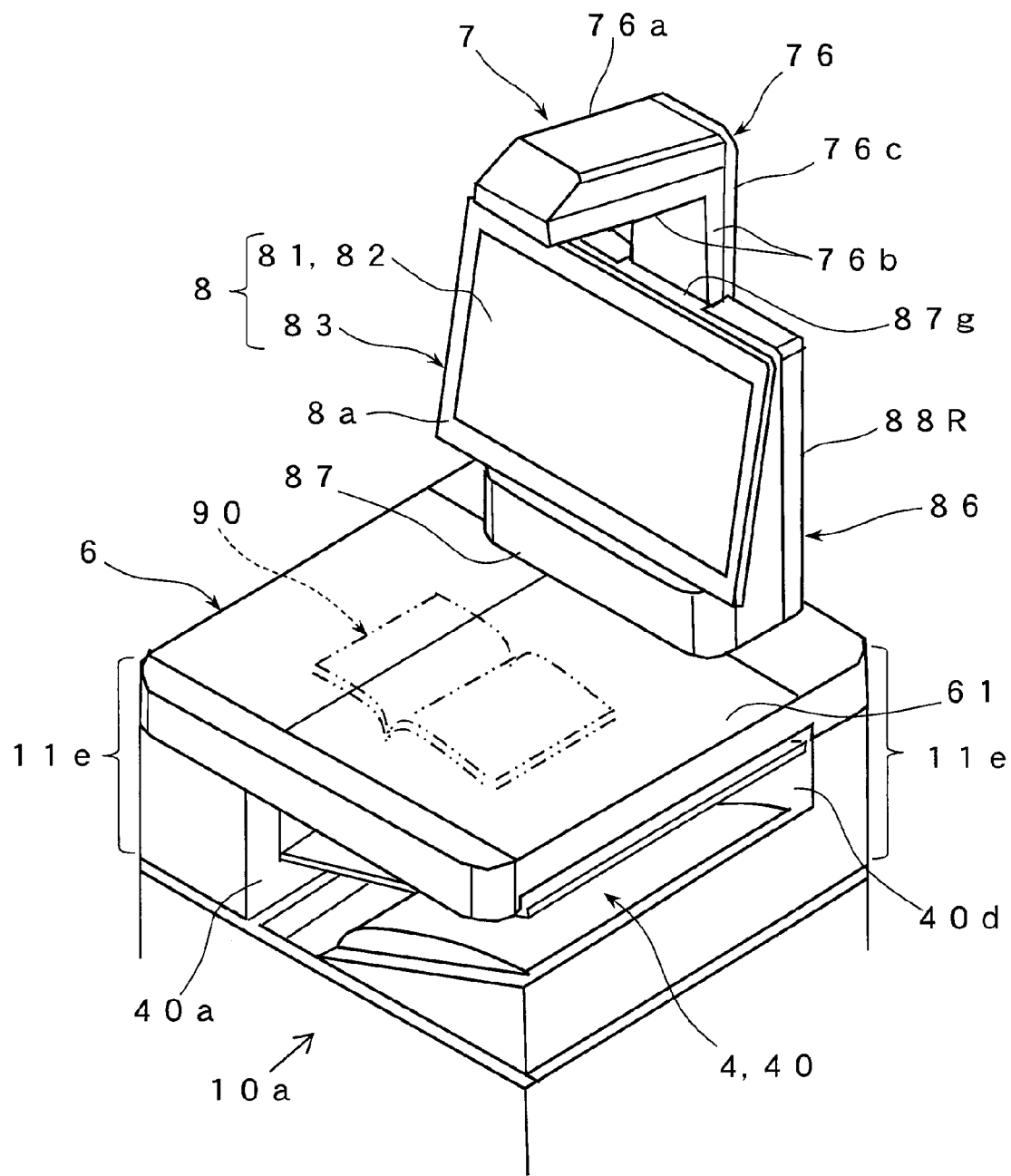
FIG. 4 is a perspective view of a reading unit of the image forming apparatus.

In the operation unit 8 according to the first exemplary embodiment, the operation section 81 constituted of the non-mechanical component is included in the display 82. Therefore, in the operation unit 8, as shown in FIG. 4, the display 82 also serving as the operation section 81 is disposed at a front surface of a plate-like support body 83.

Furthermore, in the operation unit 8, as shown in FIG. 6, an attachment shaft 83d for attaching the support body 83 in a rotatable manner is fixed to a rear surface 8R of the support body 83 by using a stationary plate 83e. The attachment shaft 83d used is, for example, a cylindrical shaft extending in the left-right direction. Moreover, the operation unit 8 includes left and right attachment jigs 84L and 84R that support the left and right ends of the attachment shaft 83d in a rotatable manner and that ultimately attach the operation unit 8 to a second attachment frame 85, to be described later. The operation unit 8 is supported by the attachment jigs 84L and 84R such that a tilt angle of an operation surface is adjustable by rotating the operation unit 8 around the attachment shaft 83d.

In the operation unit 8, the support body 83 outside the display 82 may be provided with one or both of the operation section 81 constituted of a non-mechanical component and the operation section 81 constituted of a mechanical component.

As shown in FIGS. 5 and 6, the operation unit 8 is attached to a position above the base 6 by using the second attachment frame 85. Specifically, the operation unit 8 is attached above the base 6 with a predetermined distance therefrom by using the second attachment frame 85.

Furthermore, the operation unit 8 is attached between the base 6 and the reader 7 by using the second attachment frame 85.

Moreover, as shown in FIGS. 4 to 6, in the direction toward the front surface 10F of the apparatus, the operation unit 8 is disposed in front of a portion of the first attachment frame 75 supporting the reader 7 that corresponds to the same height region as the operation unit 8. The second attachment frame 85 has the operation unit 8 attached thereto and supports the operation unit 8 at the rear surface 8R thereof.

A detailed description of the second attachment frame 85 will be provided later.

In the image forming apparatus 1, as shown in FIGS. 6 and 7, the rear frame 12 used is a support frame having a first surface 12a and a second surface 12b that is more bendable than the first surface 12a in response to an external force.

Assuming that the first surface 12a and the second surface 12b locally receive the same level of an external force, the second surface 12b is more bendable than the first surface 12a to elastically deform by, for example, about 1 mm to several millimeters at a local area centered on the part that has received the external force.

The second surface 12b may also be regarded as a surface smaller than the first surface 12a. The expression "smaller than the first surface 12a" implies that, for example, the surface area is smaller if the thickness is the same, or the rigidity is lower by varying an element, such as the reinforcement structure or the material. The reinforcement structure includes, for example, ribs or beams.

As shown in FIGS. 6 and 7, the rear frame 12 according to the first exemplary embodiment is constituted of the first surface 12a serving as a vertical surface extending in the up-down direction and the second surface 12b serving as a lateral surface extending in the lateral direction and intersecting with the upper end of the vertical surface, that is, the first surface 12a.

The rear frame 12 has left and right side surfaces 12c and 12d bent rearward at the left and right ends of the first surface 12a serving as a vertical surface.

The rear frame 12 is disposed over substantially the entire rear surface of the housing 10 from the reading unit 50 to the image forming unit 20. Alternatively, the rear frame 12 may be disposed over the rear surface from the reading unit 50 to an intermediate point of the image forming unit 20 (e.g., to the medium output section 4 and the imaging section 2), or may be disposed over the rear surface of the reading unit 50 (excluding the rear surface of the image forming unit 20).

Furthermore, as shown in FIGS. 6 and 7, in the image forming apparatus 1, the first attachment frame 75 to which the reader 7 is attached is fixed to the first surface 12a of the rear frame 12, and the second attachment frame 85 to which the operation unit 8 is attached is fixed to the second surface 12b of the rear frame 12.

In this case, as shown in FIGS. 6 and 7, the first attachment frame 75 used is constituted of a lower segment 75a, an upper segment 75b, and an attachment segment 75d.

The lower segment 75a is a plate-like segment extending linearly in the up-down direction. The upper segment 75b is a plate-like segment extending linearly in the up-down direction from the upper end of the lower segment 75a via a rear-bent connection segment 75c serving as a connector that bends upward and rearward at an angle. The attachment segment 75d is a plate-like segment protruding diagonally forward from the upper end of the upper segment 75b for attaching the reader 7.

The lower segment 75a of the first attachment frame 75 is fixed to the front-surface-10F side of the first surface 12a serving as a vertical surface of the rear frame 12. The first attachment frame 75 has a shape such that the upper segment 75b extends upward above the second surface 12b via the rear-bent connection segment 75c without being in contact with the second surface 12b serving as a first bent surface.

Furthermore, the first attachment frame 75 is a vertically-long frame in which the upper segment 75b protrudes from the upper end of the housing 10 and extends in the height direction of the apparatus without being in contact with the second surface 12b of the rear frame 12.

As shown in FIG. 6, the second attachment frame 85 is constituted of left and right second attachment frames 85L and 85R at the left and right sides of the first attachment frame 75, respectively, with respect to the first attachment frame 75, as viewed from the front surface 10F of the apparatus.

The left and right second attachment frames 85L and 85R individually have attachment surfaces (i.e., upper end surfaces) to which the left and right attachment jigs 84L and 84R of the operation unit 8 are attached. Each of the left and right second attachment frames 85L and 85R according to the first exemplary embodiment has a rectangular-parallelepiped external shape that is long in the up-down direction, and the upper end surface thereof serves as a flat attachment surface.

The left and right second attachment frames 85L and 85R are arranged in a noncontact state where the frames are not in contact with the first attachment frame 75. In detail, the left and right second attachment frames 85L and 85R are arranged at the left and right sides of the upper segment 75b and the rear-bent connection segment 75c of the first attachment frame 75 with a predetermined distance therefrom.

First Cover and Second Cover

As shown in FIGS. 1 to 6, in the reading device 5 serving as the reading unit 50 in the image forming apparatus 1, the first attachment frame 75 supporting the reader 7 is covered by a second cover 76, and the second attachment frame 85 supporting the operation unit 8 is covered by a first cover 86.

As shown in FIG. 4, the second cover 76 is roughly a combination of three split cover components, namely, an upper-end cover component 76a, an upper front cover component 76b, and a rear cover component 76c.

The upper-end cover component 76a covers an upper portion of the attachment segment 75d of the first attachment frame 75. As shown in FIG. 5 or 6, the upper-end cover component 76a entirely has a shape substantially corresponding to the shape of the upper portion of the attachment segment 75d, and is a plate-like member having a bent front edge and bent left and right edges.

The upper front cover component 76b covers a lower portion of the attachment segment 75d of the first attachment frame 75 and an exposed portion of the front surface of the upper segment 75b of the first attachment frame 75. As shown in FIGS. 5 and 6, the upper front cover component 76b entirely has a shape substantially corresponding to the shape of the lower portion of the attachment segment 75d and the shape of the front surface of the upper segment 75b of the first attachment frame 75, and is a plate-like member having an upward or rearward bent front edge and upward or rearward bent left and right edges.

The upper rear end of the upper front cover component 76b is provided with a segment 76e that extends downward to cover an upper front surface of the upper segment 75b of the first attachment frame 75. Of the upper segment 75b of the first attachment frame 75, an upper end portion excluding a lower portion hidden by the operation unit 8, as viewed from the front surface 10F of the apparatus, is covered by the segment 76e of the upper front cover component 76b. Moreover, as shown in FIG. 5, an upper front end of the upper front cover component 76b is provided with an opening 76d that allows the reader 7 to extend therethrough to expose the reader 7 downward.

The rear cover component 76c covers an exposed portion of the rear surface of the upper segment 75b of the first attachment frame 75 (i.e., a portion exposed upward from the second surface 12b of the rear frame 12). As shown in FIG. 6, the rear cover component 76c entirely has a shape substantially corresponding to the shape of the rear surface of the upper segment 75b of the first attachment frame 75, and is a plate-like member having a forward-bent upper edge and forward-bent left and right edges.

As shown in FIGS. 2 to 5, the first cover 86 is roughly a combination of three split cover components, namely, a front cover component 87 and left and right rear cover components 88L and 88R.

For example, the front cover component 87 includes a front segment 87a covering a gap between the base 6 and the operation unit 8 from the front surface 10F of the apparatus, as well as an upper segment 87b and left and right segments 87c and 87d that cover a gap between the operation unit 8 and the first attachment frame 75 by surrounding the gap from the upper side and the left and right sides, respectively. With regard to the front cover component 87, for example, the front segment 87a, the upper segment 87b, and the left and right segments 87c and 87d may be split parts (i.e., separate parts). The front cover component 87 may be assembled by joining the split parts together and may be disassembled by detaching the split parts from one another.

The upper segment 87b and the left and right segments 87c and 87d of the front cover component 87 may collectively be referred to as an intermediate cover component 89 (see FIG. 5) since the segments correspond to a cover component existing between the front segment 87a and the left and right rear cover components 88L and 88R.

The front segment 87a has a shape that covers the gap between the base 6 and the operation unit 8 from the front surface 10F of the apparatus and that slightly extends around the gap toward the left and right side surfaces. The front segment 87a is provided with an inclined upper surface 87e as a slope extending rearward and upward at an angle toward the lower edge of the operation unit 8.

The upper segment 87b and the left and right segments 87c and 87d constituting the intermediate cover component 89 have an inverted U shape that covers an inner portion, excluding the upper edge and the left and right edges, of the rear surface 83b of the support body 83 serving as the rear surface 8R (see FIG. 6) of the operation unit 8. With regard to each of the left and right segments 87c and 87d, a portion located above the upper edge of the inclined upper surface 87e of the front segment 87a tapers to the upper end such that the portion is inclined rearward.

A front portion surrounded by the upper segment 87b and the left and right segments 87c and 87d and located above the upper edge of the inclined upper surface 87e of the front segment 87a is provided with an opening 87f. The opening 87f allows parts, such as the attachment jigs 84L and 84R located at the rear surface 8R of the operation unit 8 and the left and right second attachment frames 85L and 85R, to extend therethrough. The opening 87f is, for example, rectangular.

The opening 87f is a rectangular opening with an area that corresponds to the inner portion, excluding the upper edge and the left and right edges, of the rear surface of the support body 83 of the operation unit 8.

Furthermore, as shown in FIGS. 4 and 5, the upper segment 87b of the front cover component 87 is provided with a protrusion 87g that covers a gap located between the left and right rear cover components 88L and 88R and extending to the upper front cover component 76b of the second cover 76.

The left and right rear cover components 88L and 88R are separately arranged at the left and right sides of the first attachment frame 75 serving as a dividing line at the rear surface 8R of the operation unit 8, and at least partially cover the left and right second attachment frames 85L and 85R.

Figure 9A:
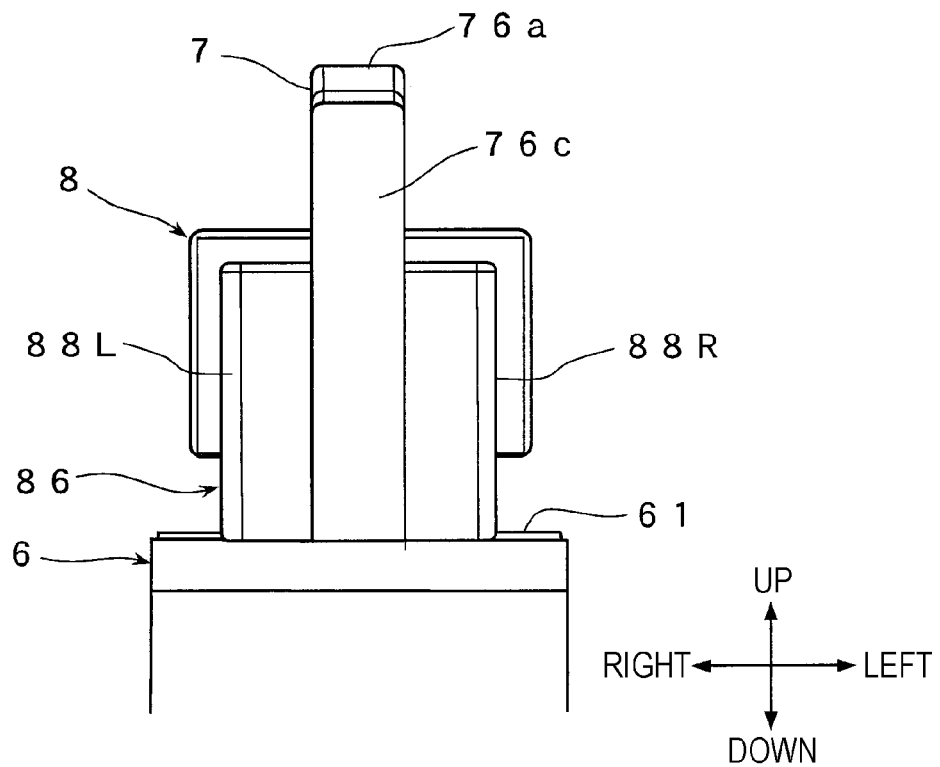
FIG. 9A is a rear view of the reading unit of the image forming apparatus.
Figure 9B:
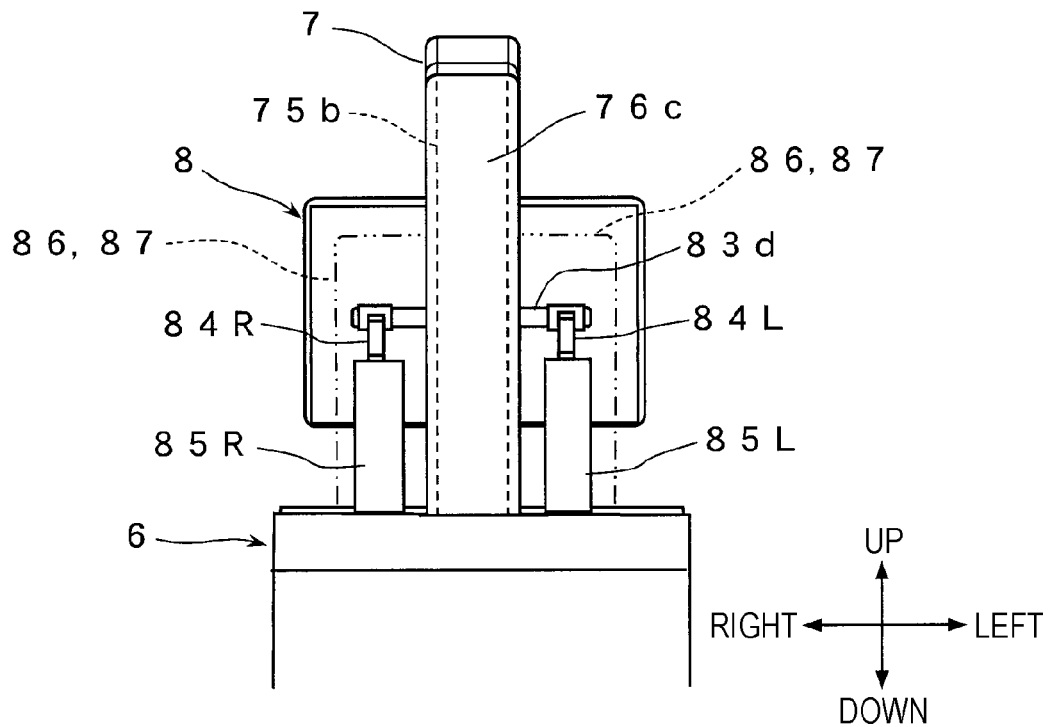
FIG. 9B is a rear view of the reading unit in FIG. 9A from which the second cover (i.e., left and right rear cover components) has been removed.

In detail, the left and right rear cover components 88L and 88R are two split left and right cover components that cover portions not covered by the rear cover component 76c of the second cover 76 at the rear side (i.e., the rear surface) of the front cover component 87 (see FIG. 9B). Of the left and right second attachment frames 85L and 85R, portions visible from a rear surface 10R of the apparatus are portions visible from directly behind the apparatus, that is, from the rear surface 10R side.

As shown in FIG. 5, with regard to each of the left and right rear cover components 88L and 88R, a body segment 88a excluding an upper segment 88b serving as a forward-bent upper edge and a side segment 88c or 88d serving as a forward-bent left or right edge has a substantially rectangular shape that is long in the up-down direction.

Furthermore, the left and right rear cover components 88L and 88R have the same height in the up-down direction, and the height thereof is lower than the height at the upper end of the operation unit 8. With regard to the height, the left and right rear cover components 88L and 88R may have the same height as the height at the upper end of the operation unit 8.

Figure 10A:
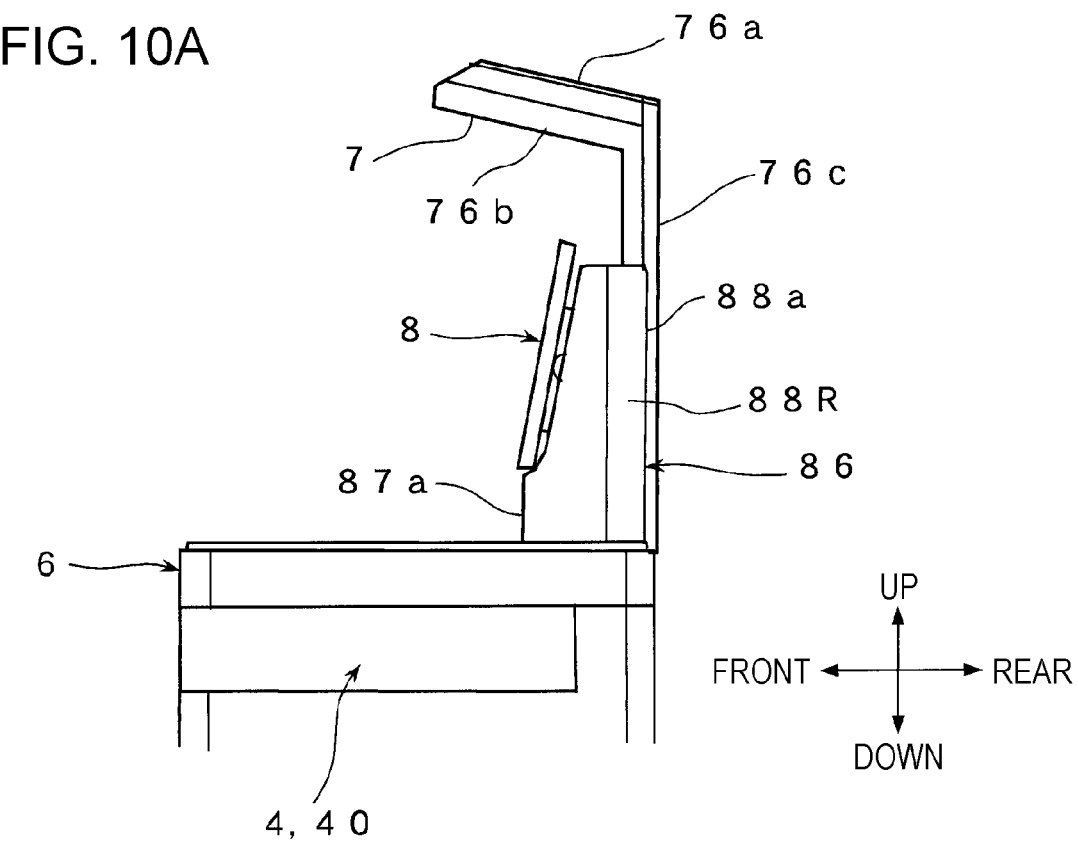
FIG. 10A is a right side view of the reading unit of the image forming apparatus.
Figure 10B:
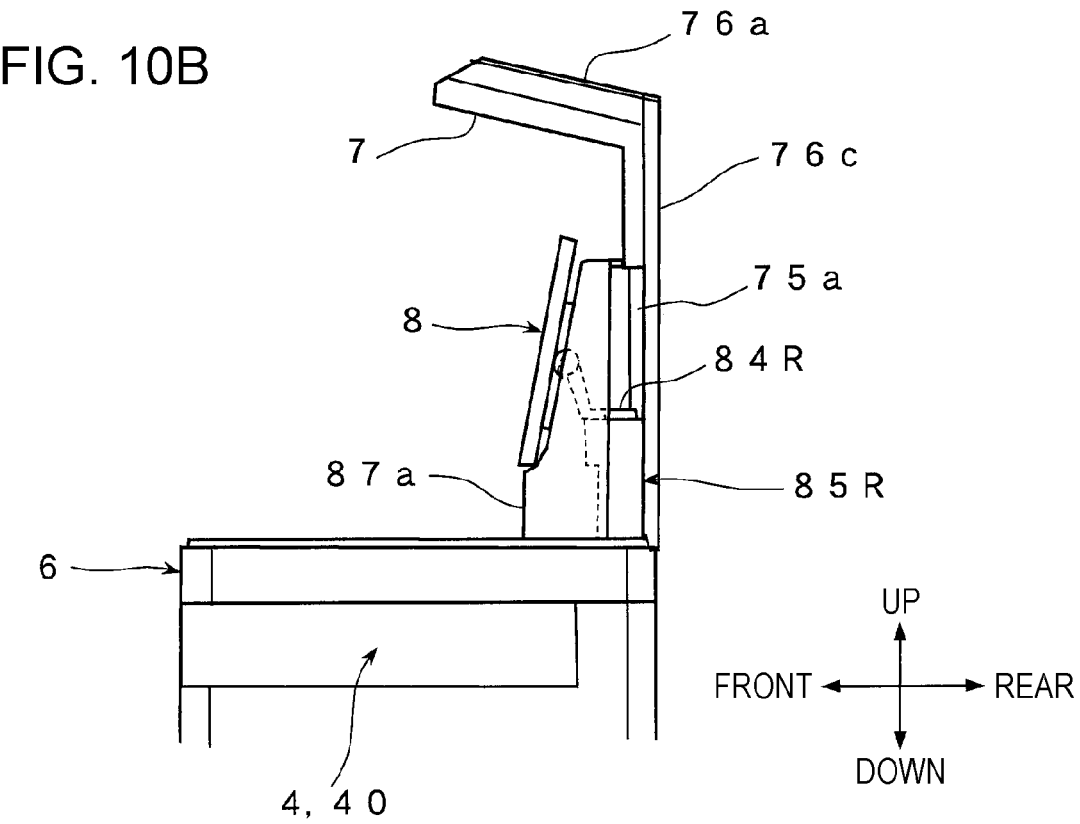
FIG. 10B is a right side view of the reading unit in FIG. 10A from which the left and right rear cover components of the second cover have been removed.

Moreover, as viewed from the right side or the left side as shown in FIG. 10A, each of the left and right rear cover components 88L and 88R has a shape such that the body segment 88a thereof is disposed toward the front surface 10F (i.e., toward the front side) of the apparatus relative to the rear cover component 76c of the first attachment frame 75, or is attached to be disposed in front of the rear cover component 76c. Alternatively, each of the left and right rear cover components 88L and 88R may have a shape such that the body segment 88a thereof is substantially flush with the rear cover component 76c of the first attachment frame 75, or may be attached in the flush state.

As viewed from the rear surface 10R of the apparatus, the left and right rear cover components 88L and 88R have a shape capable of at least partially covering the left and right second attachment frames 85L and 85R. Alternatively, the left and right rear cover components 88L and 88R may have a shape capable of entirely covering the left and right second attachment frames 85L and 85R.

The second cover 76 is attached to, for example, the first attachment frame 75 by an attachment-detachment technique, such as snap-fitting, or by a fixing technique, such as screwing.

With regard to the second cover 76, the split components thereof, namely, the upper-end cover component 76a, the upper front cover component 76b, and the rear cover component 76c, may be joined to each other by using, for example, a fitting method or a hooking method.

On the other hand, for example, the first cover 86 is attached distributively to the left and right second attachment frames 85L and 85R. Similar to the case of the second cover 76, the first cover 86 is attached by using an attachment-detachment technique, such as snap-fitting, or a fixing technique, such as screwing.

Similar to the case of the second cover 76, the split components of the first cover 86, namely, the front cover component 87 and the left and right rear cover components 88L and 88R, may be joined to each other by using, for example, a fitting method or a hooking method. The front cover component 87 of the first cover 86 may be attached to an area at the rear surface 8R of the operation unit 8.

The front cover component 87 according to the first exemplary embodiment includes the front segment 87a, the upper segment 87b, and the left and right segments 87c and 87d as split parts (i.e., separate parts). The assembly and attachment process of the front cover component 87 is performed by, for example, fitting the split part of the front segment 87a from below the operation unit 8, the split part of the upper segment 87b from above the operation unit 8, the split part of the left segment 87c from the left side of the operation unit 8, and the split part of the right segment 87d from the right side of the operation unit 8, and bonding or fixing the split parts together.

Usage and Operation of Image Forming Apparatus and Reading Device

The image forming apparatus 1 having the above-described configuration is capable of forming an image corresponding to image information input from a connected external apparatus onto the recording medium 9 in the image forming unit 20. In this case, the recording medium 9 having the image formed thereon is discharged and output to the medium output section 4.

Furthermore, the image forming apparatus 1 is capable of causing the reader 7 in the reading device 5 of the reading unit 50 to read the read target object 90 placed on the base 6 and displaying the read information as a read image on the display 82 of the operation unit 8.

Moreover, the image forming apparatus 1 is capable of loading the read information of the read target object 90 read by the reading device 5 of the reading unit 50 as image information into the image forming unit 20 and forming an image corresponding to the image information onto the recording medium 9. Accordingly, the image forming apparatus 1 is also capable of recording the read image of the read target object 90 onto the recording medium 9 and outputting the recording medium 9.

As shown in FIGS. 1 to 4, in the reading unit 50 of the image forming apparatus 1, the first attachment frame 75 to which the reader 7 is attached is covered by the second cover 76 so as not to be visible from the outside, and likewise, the second attachment frame 85 to which the operation unit 8 is attached is covered by the first cover 86 so as not to be visible from the outside.

Furthermore, as shown in FIGS. 1 and 2, in the image forming apparatus 1, the first attachment frame 75 (including the second cover 76) to which the reader 7 is attached to be disposed above the base 6 exists at the rear surface of the operation unit 8.

However, since the first cover 86 has the left and right rear cover components 88L and 88R in the image forming apparatus 1, for example, a rear portion serving as an example of at least a portion of the second attachment frame 85 to which the rear surface 8R of the operation unit 8 is attached is not visible from the rear surface 10R of the apparatus, as shown in FIG. 2 and FIGS. 9A and 9B. As a result, the appearance quality of the image forming apparatus 1 may be favorably maintained at the rear surface of the apparatus.

In the image forming apparatus 1, the first cover 86 has the front cover component 87. Thus, in the image forming apparatus 1, as shown in FIGS. 1 and 7, portions of the first attachment frame 75 and the second attachment frame 85 existing between the operation unit 8 and the base 6 are not visible from the front surface 10F of the apparatus.

Figure 8A:
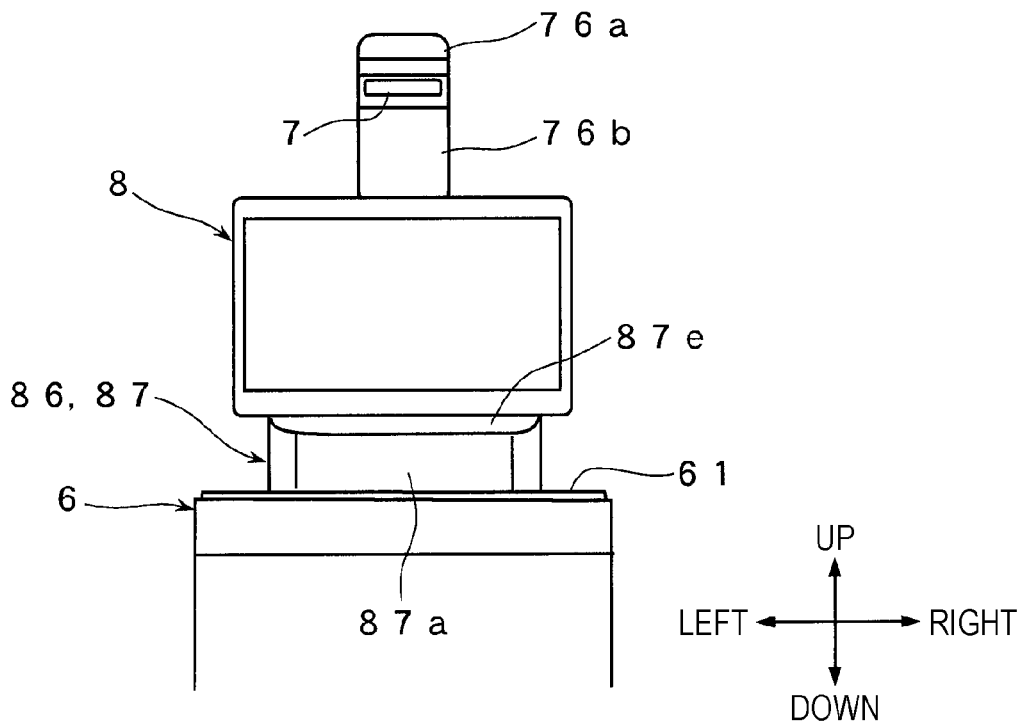
FIG. 8A is a front view of the reading unit of the image forming apparatus.
Figure 8B:
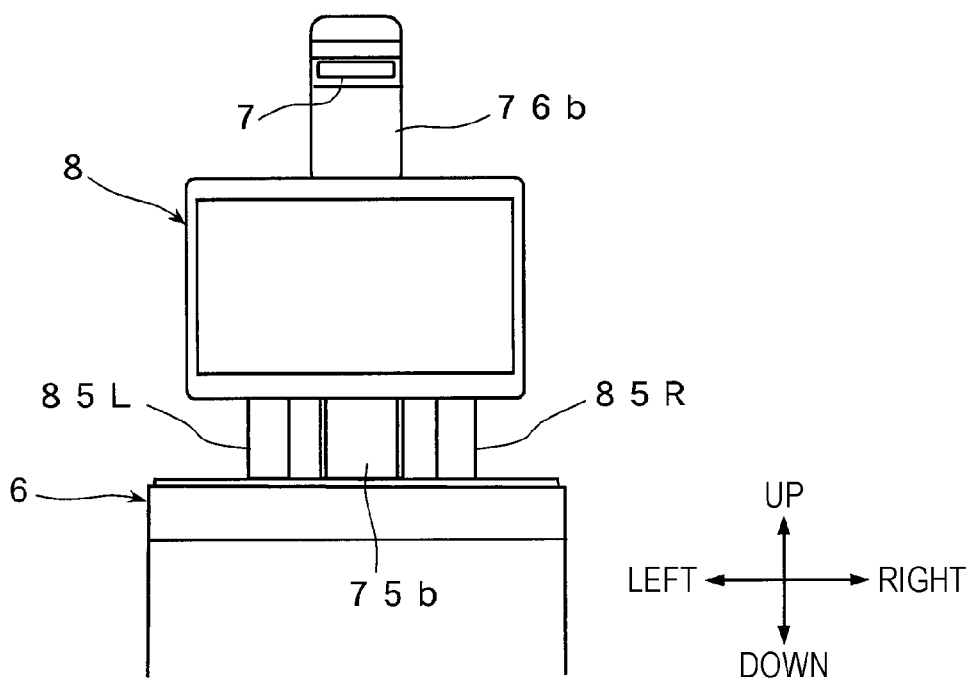
FIG. 8B is a front view of the reading unit in FIG. 8A from which the second cover has been removed.

Furthermore, in the image forming apparatus 1, the first cover 86 has the front cover component 87 and the left and right rear cover components 88L and 88R. Thus, in the image forming apparatus 1, as shown in FIG. 1 and FIGS. 8A and 8B, portions of the first attachment frame 75 and the second attachment frame 85 existing between the operation unit 8 and the base 6 are not visible from the front surface 10F of the apparatus.

Moreover, in the image forming apparatus 1, the first cover 86 has the intermediate cover component 89. Thus, in the image forming apparatus 1, as shown in FIGS. 1 to 4, FIGS. 9A and 9B, and FIGS. 10A and 10B, a portion of the second attachment frame 85 existing between the operation unit 8 and the first attachment frame 75 is not visible, as compared with a case where the first cover 86 does not have the intermediate cover component 89.

Furthermore, in the image forming apparatus 1, as shown in FIGS. 1 and 4, the operation unit 8 is disposed between the base 6 and the reader 7. Thus, in the image forming apparatus 1, the operation unit 8 is appropriately disposed at a height that is not too low or too high, as compared with a case where the operation unit 8 is disposed at a height where the operation unit 8 comes into contact with the base 6, is appropriately disposed at the same height as the reader 7, or is appropriately disposed at a position higher than the reader 7, whereby enhanced operability of the operation unit 8 may be achieved.

Furthermore, in the image forming apparatus 1, as shown in FIGS. 5 and 6, the second attachment frame 85 is constituted of the left and right second attachment frames 85L and 85R. Thus, in the image forming apparatus 1, the occurrence of vibration may be suppressed when the user manually operates the operation unit 8 by touching, as compared with a case where the second attachment frame 85 is constituted of only one of the left and right second attachment frames 85L and 85R.

Moreover, in the image forming apparatus 1, as shown in FIG. 6, the first attachment frame 75 and the left and right second attachment frames 85L and 85R are arranged in a noncontact state where the frames are not in contact with each other. Thus, when the operation unit 8 is operated, the image forming apparatus 1 may suppress transmission of vibration from the left and right second attachment frames 85L and 85R to the first attachment frame 75, as compared with a case where the frames are arranged in contact with each other.

Furthermore, in the image forming apparatus 1, as shown in FIG. 6, the second cover 76 is attached to the first attachment frame 75, and the first cover 86 is attached to the second attachment frame 85. Thus, when the operation unit 8 is operated, the image forming apparatus 1 may suppress transmission of vibration from the first cover 86 to the second cover 76, as compared with a case where the second cover 76 is not attached to the first attachment frame 75 and the first cover 86 is not attached to the second attachment frame 85.

In the image forming apparatus 1, for example, when the reading unit 50 is to read the read target object 90, the user controls the apparatus by operating the operation unit 8, thereby starting the reading process.

In this case, when the user operates the operation unit 8 to start the reading process, the reader 7 operates to read the read target object 90 placed on the base 6.

However, when this reading process starts, the operation unit 8 is vibrated due to the user touching and manually operating the operation unit 8, and the vibration is transmitted from the second attachment frame 85 to which the operation unit 8 is attached toward the first attachment frame 75 to which the reader 7 is attached, ultimately causing the reader 7 to shake.

When such shaking of the reader 7 occurs, the read information obtained by the shaking reader 7 becomes distorted. As a result, when the read information is displayed on the display 82, the displayed image becomes distorted. When the image forming unit 20 forms an image by using the read information as image information, the formed image becomes distorted.

In contrast, in the image forming apparatus 1, the first attachment frame 75 to which the reader 7 is attached in the reading unit 50, that is, the reading device 5, is fixed to the first surface 12*a* of the rear frame 12, and the second attachment frame 85 to which the operation unit 8 is attached is fixed to the second surface 12*b* of the rear frame 12.

Therefore, in the image forming apparatus 1, shaking of the reader 7 occurring when the operation unit 8 is operated by being touched by the user may be suppressed, as compared with a case where both the first attachment frame 75 and the second attachment frame 85 are fixed to the same surface, such as the first surface 12*a*, of the rear frame 12.

Furthermore, in the image forming apparatus 1, the occurrence of vibration when the user manually operates the operation unit 8 by touching may be suppressed, as mentioned above. Moreover, transmission of vibration occurring in response to an operation performed on the operation unit 8 from the left and right second attachment frames 85L and 85R to the first attachment frame 75 may also be suppressed. In addition, transmission of vibration occurring in response to an operation performed on the operation unit 8 from the first cover 86 to the second cover 76 may be suppressed.

With the suppressed occurrence and transmission of vibration, shaking of the reader 7 occurring when the operation unit 8 is operated by being touched may be readily suppressed in the image forming apparatus 1.

Second Exemplary Embodiment

Figure 11:
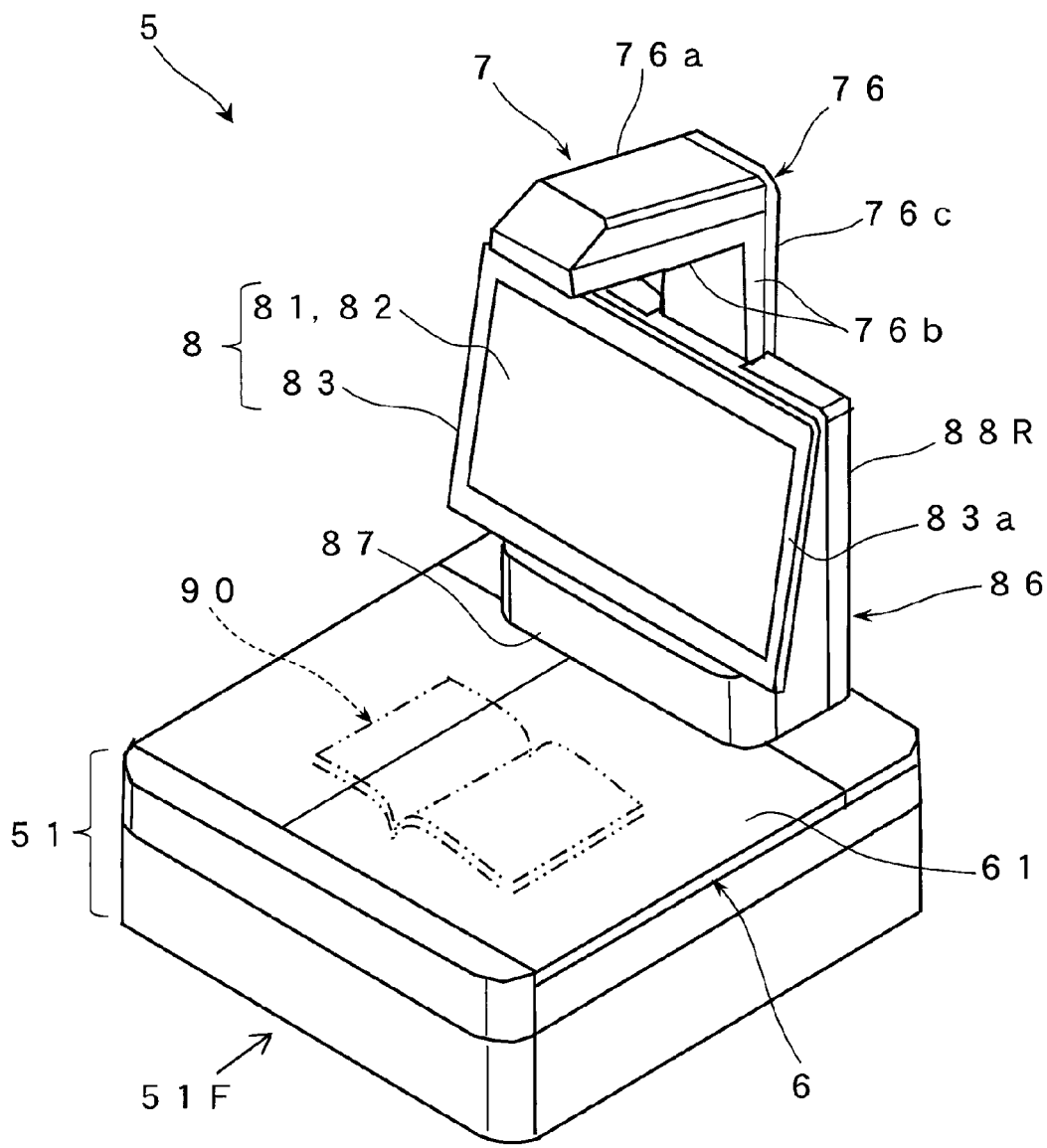
FIG. 11 is a perspective view of a reading device according to a second exemplary embodiment.
Figure 11:
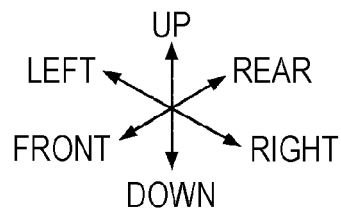

FIG. 11 illustrates a reading device 5 according to a second exemplary embodiment of the disclosure.

The reading device 5 according to the second exemplary embodiment has a configuration similar to that of the reading unit 50 or the reading device 5, excluding the housing 10 and the image forming unit 20, in the image forming apparatus 1 according to the first exemplary embodiment.

Therefore, in the following description and relevant drawings, identical components will be given the same reference signs used in the first exemplary embodiment and will not be described unless otherwise necessary.

As shown in any one of FIGS. 11 to 15, the reading device 5 includes the base 6, the reader 7, the operation unit 8, the first attachment frame 75, the second attachment frame 85, the first cover 86, and the second cover 76.

The base 6 is where the read target object 90 is to be placed. The reader 7 reads the read target object 90 placed on the base 6. The operation unit 8 is a touch-sensitive unit used for operating the device. The first attachment frame 75 is used for attaching the reader 7 to a position above the base 6. The second attachment frame 85 is used for attaching the operation unit 8 to a position above the base 6. The first cover 86 is for covering the second attachment frame 85. The second cover 76 is for covering the first attachment frame 75.

In FIG. 11, reference sign 51 denotes a housing of the reading device 5, reference sign 51F denotes a front surface of the device, and reference sign 51R denotes a rear surface of the device.

Figure 13:
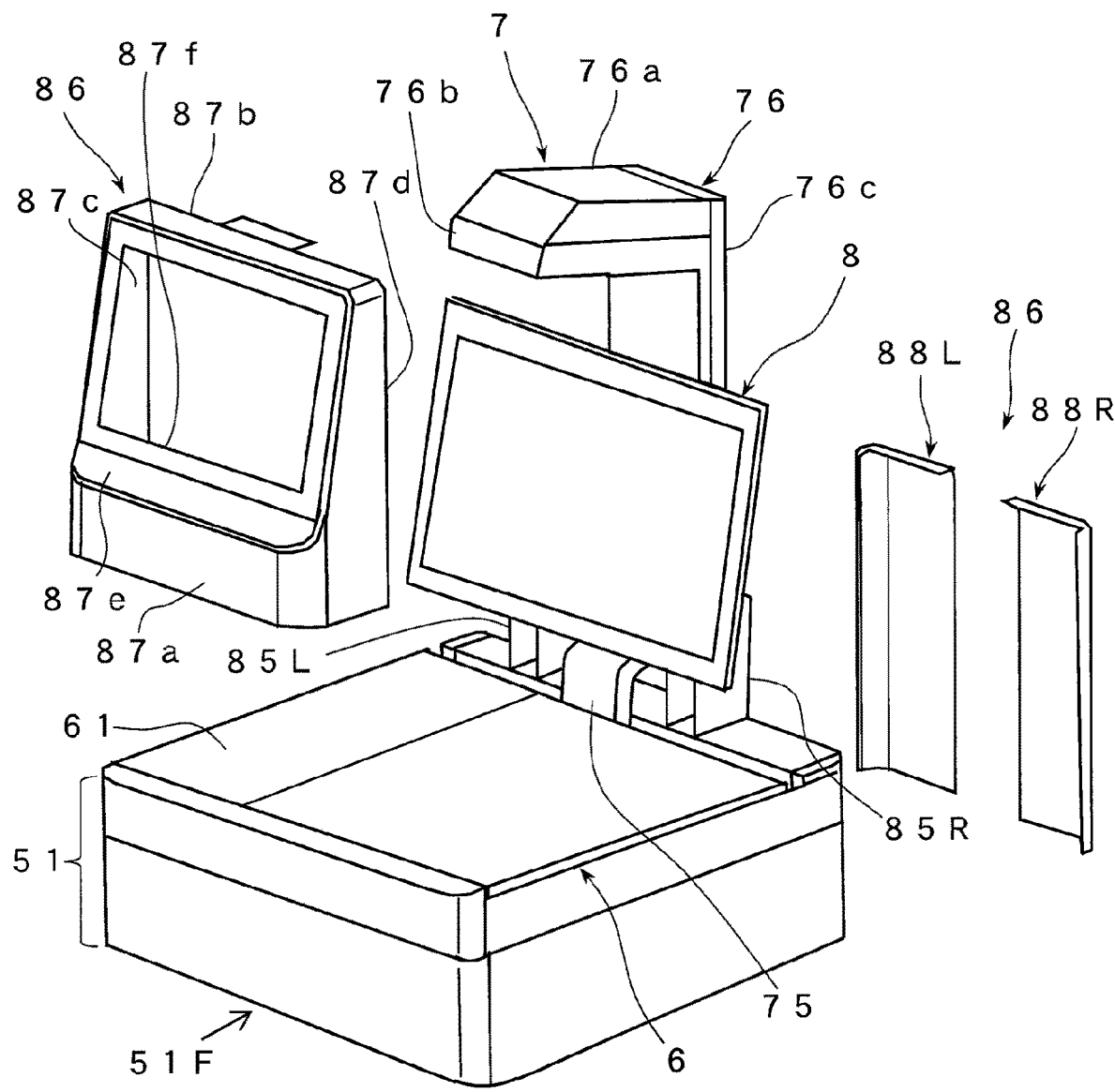
FIG. 13 is a front perspective view illustrating the reading device from which the second cover has been removed.

The housing 51 is a structural body having a predetermined structure and shape and formed of components, such as multiple frames and an external cover. As shown in FIG. 13, the housing 51 according to the second exemplary embodiment is a rectangular-parallelepiped structural body that is relatively short in the up-down direction, that is, has a relatively small height.

Figure 14:
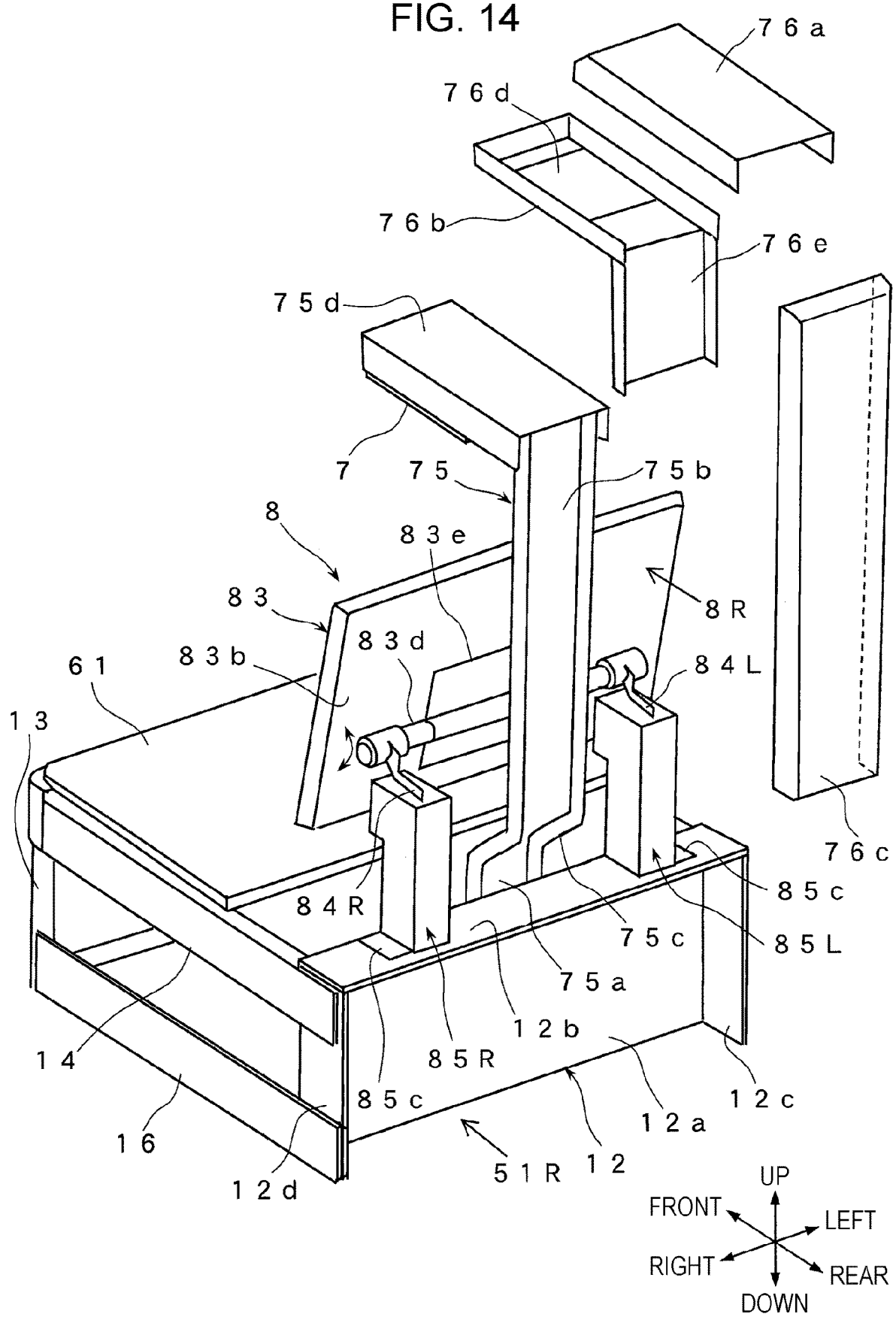
FIG. 14 is a rear perspective view illustrating the reading device from which the first cover has been removed.
Figure 15:
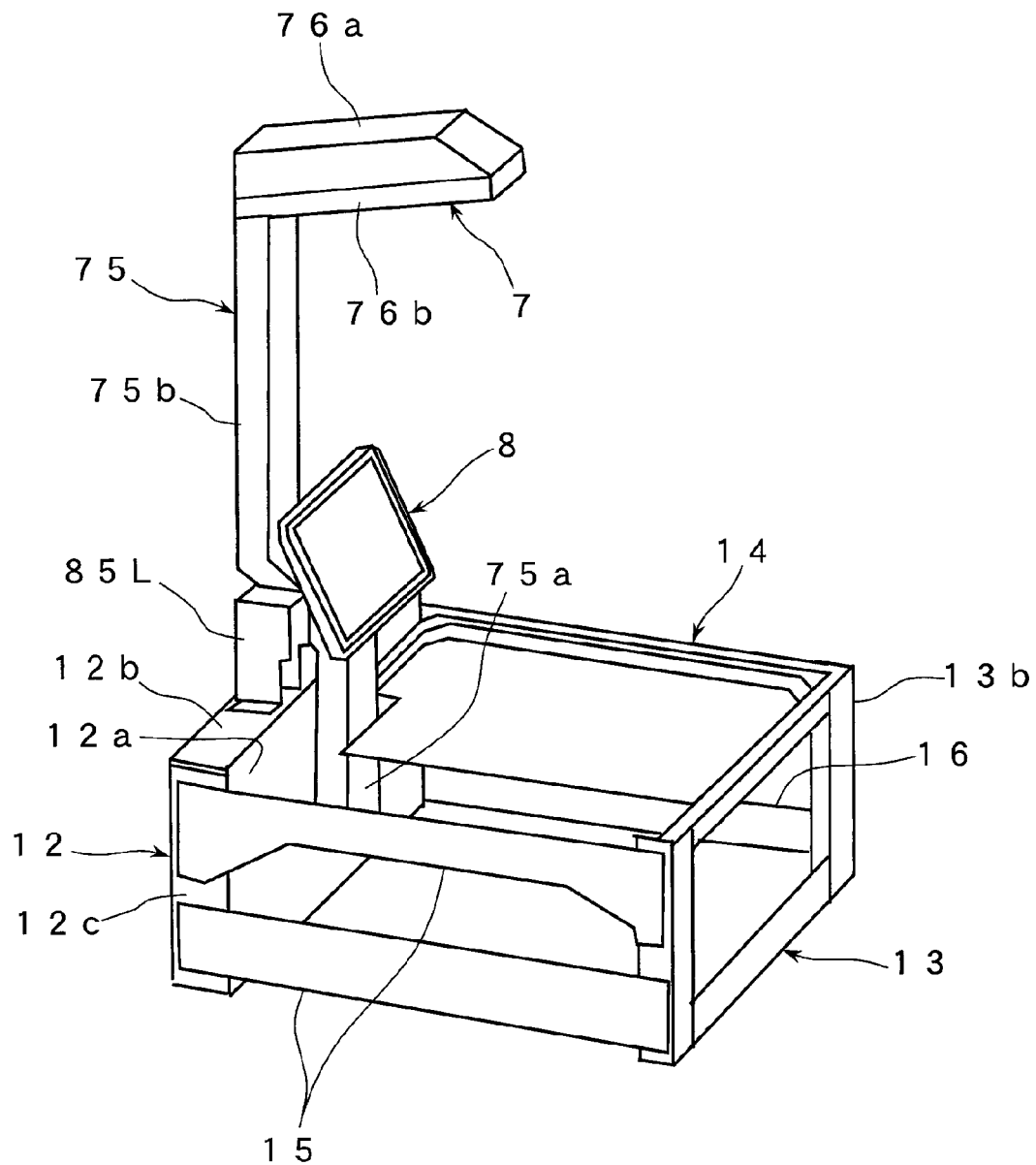
FIG. 15 is a perspective view illustrating a part of the reading device, such as a framework section and attachment frames.
Figure 15:
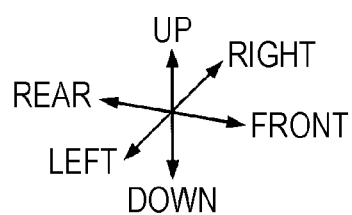

Furthermore, as shown in FIGS. 14 and 15, the internal framework section of the housing 51 includes frames, such as the rear frame 12, the front frame 13, the upper frame 14, upper and lower left side frames 15, and the right side frame 16.

Similar to the case of the reading unit 50 or the reading device 5 according to the first exemplary embodiment, the rear frame 12 used is a support frame having the first surface 12a and the second surface 12b that is more bendable than the first surface 12a in response to an external force or that is smaller than the first surface 12a. However, this rear frame 12 is shorter in the up-down direction (due to not having the image forming unit 20) than the rear frame 12 of the housing 10 according to the first exemplary embodiment.

Figure 12:
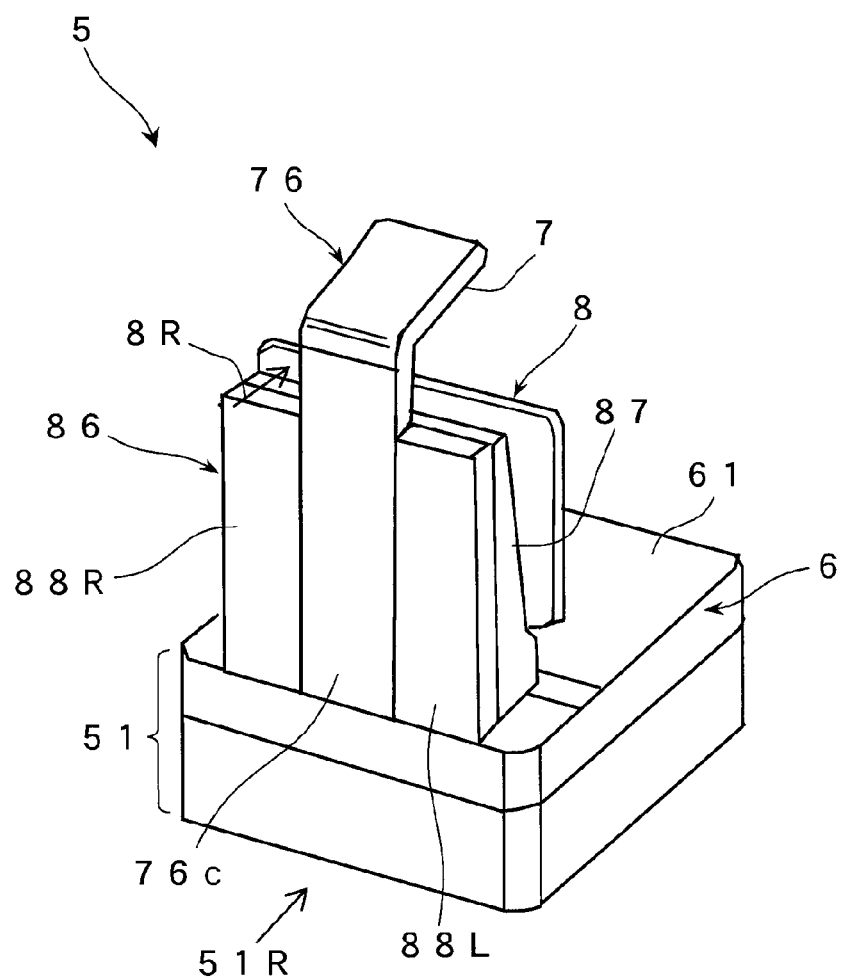
FIG. 12 is a rear perspective view of the reading device in FIG. 11.
Figure 12:
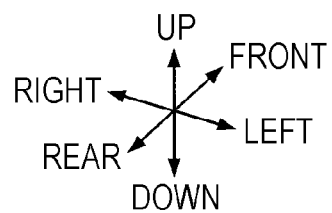

In the reading device 5, as shown in FIGS. 11 to 13, the first cover 86 used is a combination of three split cover components, namely, the front cover component 87 and the left and right rear cover components 88L and 88R, similar to the case of the reading unit 50 or the reading device 5 according to the first exemplary embodiment.

Similar to the first exemplary embodiment, the left and right rear cover components 88L and 88R are separately arranged at the left and right sides of the first attachment frame 75 serving as a dividing line at the rear surface 8R of the operation unit 8, and partially cover the left and right second attachment frames 85L and 85R. The left and right rear cover components 88L and 88R according to the second exemplary embodiment partially cover portions of the left and right second attachment frames 85L and 85R that are visible from the rear surface 51R of the device (see FIG. 16B), as well as left and right portions and upper portions thereof.

Furthermore, in the reading device 5, as shown in FIG. 15, the first attachment frame 75 to which the reader 7 is attached is fixed to the first surface 12a of the rear frame 12, and the second attachment frame 85 to which the operation unit 8 is attached is fixed to the second surface 12b of the rear frame 12, similar to the case of the reading unit 50 or the reading device 5 according to the first exemplary embodiment.

The reading device 5 is capable of using the reader 7 to read the read target object 90 placed on the base 6 and displaying the read information as a read image on the display 82 of the operation unit 8.

Moreover, the reading device 5 is capable of loading the read information of the read target object 90 as image information into, for example, an output apparatus, such as an image forming apparatus connected to the reading device 5 in a wireless or wired manner, and subsequently using an image corresponding to the image information to be formed on the recording medium 9. Accordingly, the reading device 5 may be used as an image reading device of an image forming apparatus.

In the reading device 5, as shown in FIGS. 11 and 12, the first attachment frame 75 to which the reader 7 is attached is covered by the second cover 76 so as not to be visible from the outside, and likewise, the second attachment frame 85 to which the operation unit 8 is attached is covered by the first cover 86 so as not to be visible from the outside.

Furthermore, in the reading device 5, as shown in FIGS. 11 and 12, the vertically-long first attachment frame 75 (including the second cover 76) to which the reader 7 is attached to be disposed above the base 6 exists at the rear surface of the operation unit 8.

Figure 16A:
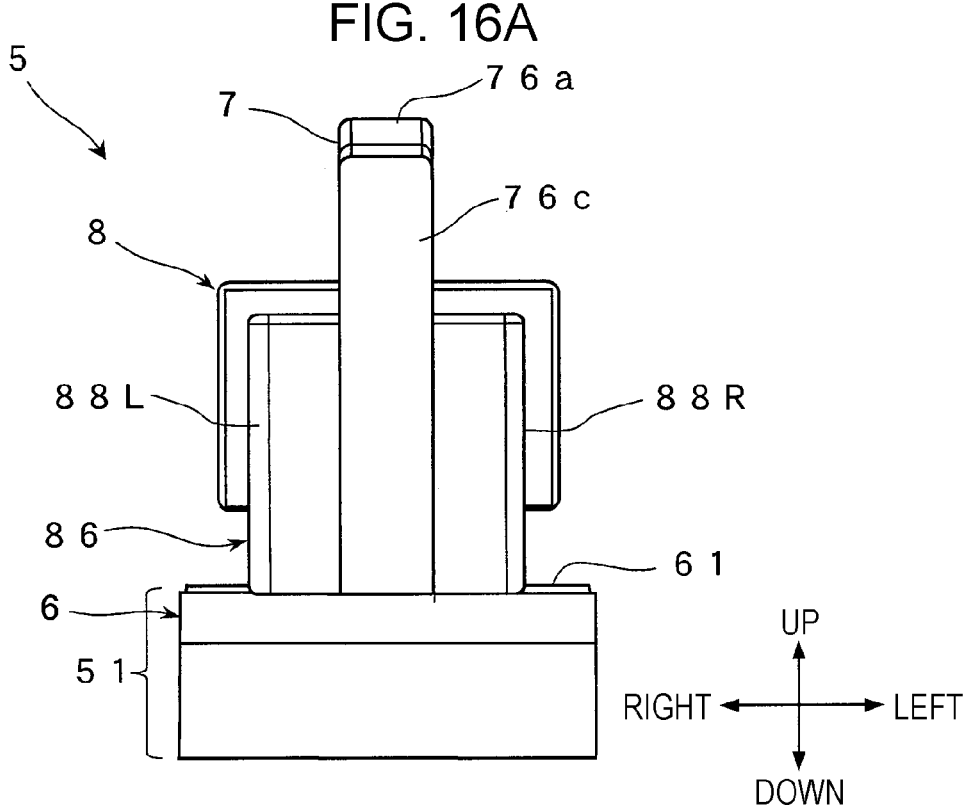
FIG. 16A is a rear view of a reading unit of the reading device.
Figure 16B:
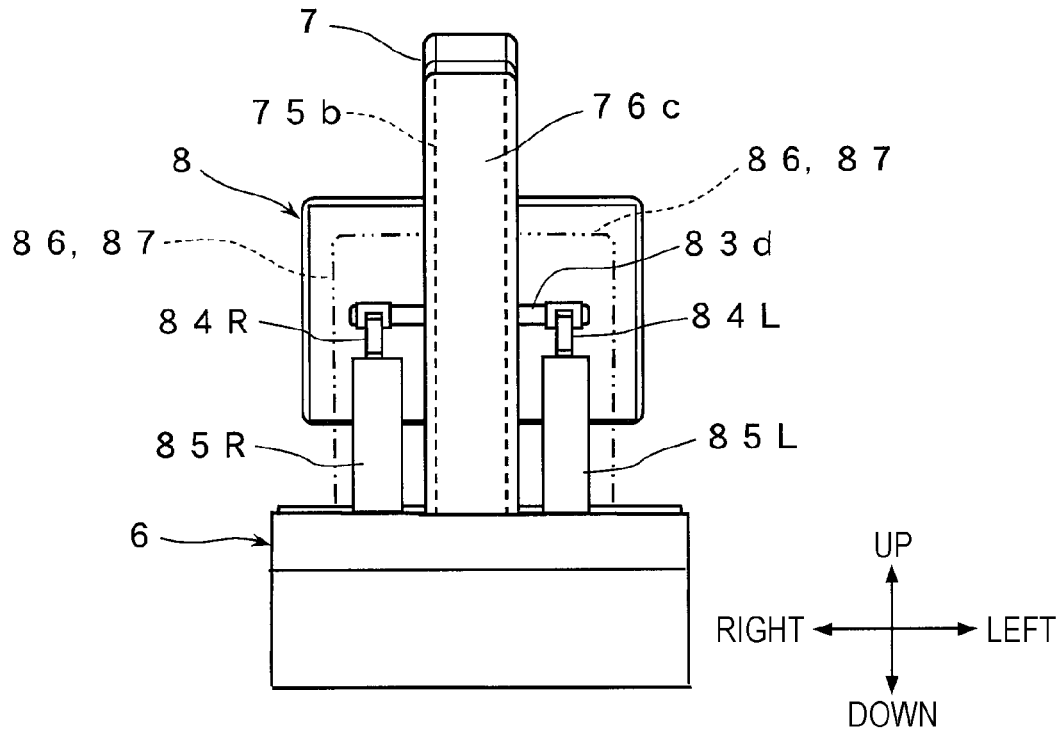
FIG. 16B is a rear view of the reading device in FIG. 16A from which the second cover (i.e., left and right rear cover components) has been removed.

However, since the first cover 86 in the reading device 5 has the left and right rear cover components 88L and 88R, for example, a rear portion serving as an example of at least a portion of the second attachment frame 85 to which the rear surface of the operation unit 8 is attached is not visible from the rear surface 51R of the device, as shown in FIG. 12 and FIGS. 16A and 16B. As a result, the appearance quality of the reading device 5 may be favorably maintained at the rear surface of the device.

Furthermore, since the reading device 5 has various components similar to those of the reading unit 50 or the reading device 5 according to the first exemplary embodiment described above, similar effects may be achieved by the components.

Modifications

The exemplary embodiments of the disclosure are not to be limited to the contents described in the first and second exemplary embodiments, and may include, for example, modifications to be described below.

The first cover 86 may be constituted of two split components, namely, left and right split cover components. Specifically, the left and right split cover components are obtained by splitting the front cover component 87 into two components as left and right front cover components (87L and 87R) that are to be respectively joined to the left and right rear cover components 88L and 88R.

The overall shape of the first attachment frame 75 to which the reader 7 is attached is not limited to the shape described in the first exemplary embodiment.

Figure 17:
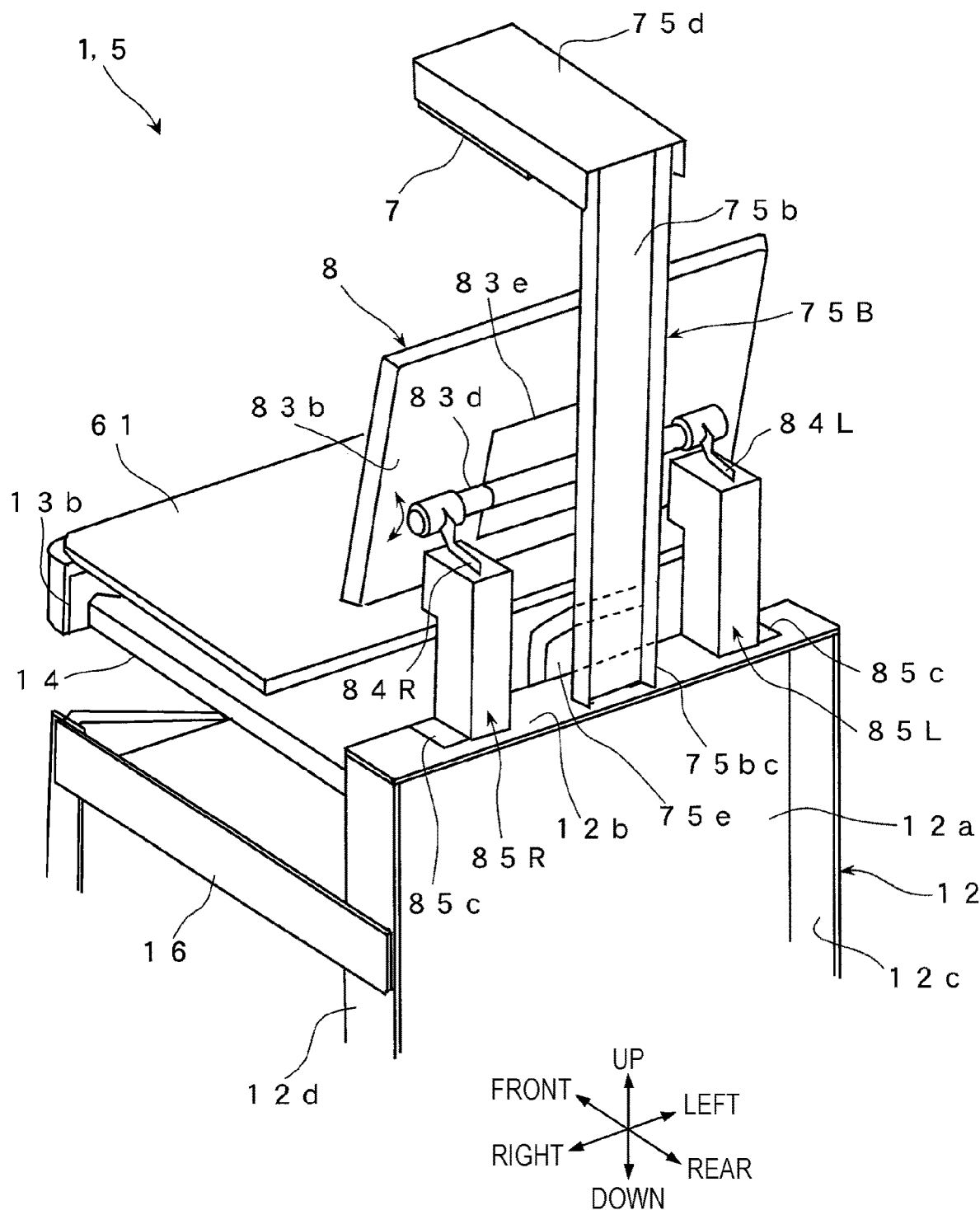
FIG. 17 is a rear perspective view of the image forming apparatus or the reading device equipped with a first attachment frame according to a modification.

For example, a first attachment frame 75B as shown in FIG. 17 may be used. In the first attachment frame 75B shown in FIG. 17, a lower end 75bc of the upper segment 75b extends to and is fixed to the second surface 12b of the rear frame 12, and a coupling frame 75e fixed to the second surface 12b of the rear frame 12 is joined to the front surface at the lower end of the upper segment 75b. In this case, for example, the coupling frame 75e used has a shape similar to a combination of the lower segment 75a and the rear-bent connection segment 75c of the rear frame 12 according to the first exemplary embodiment.

The first attachment frame 75B is securely attached to the rear frame 12. In the case where such a first attachment frame 75B is used, the reader 7 may be attached in a state where shaking of the reader 7 is less likely to occur.

In the first attachment frame 75, for example, a part excluding the lower segment 75a to be fixed to the first surface 12a of the rear frame 12 may have a movable structure, such as a rotatable structure, for adjusting the position and orientation of the reader 7.

The second attachment frame 85 to which the operation unit 8 is attached may be a single attachment frame disposed at one of the left and right sides of the first attachment frame 75 with a distance from the first attachment frame 75.

However, for suppressing vibration occurring when the operation unit 8 is operated, the second attachment frame 85 may be constituted of the left and right second attachment frames 85L and 85R arranged at both the left and right sides of the first attachment frame 75 with a distance from the first attachment frame 75, as described in the first exemplary embodiment.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
a base on which a read target object is placed;
a reader that reads the read target object placed on the base;
a first attachment frame to which the reader is attached such that the reader is disposed above the base;
an operation unit that is to be operated by a user;
a second attachment frame to which a rear surface of the operation unit is attached such that the operation unit is disposed in front of the first attachment frame in a direction toward a front surface of the reading device; and
a first cover that covers the second attachment frame,
wherein the first cover includes left and right rear cover components that are separately arranged at left and right sides of the first attachment frame serving as a dividing line at the rear surface of the operation unit and that cover at least a portion of the second attachment frame.

2. The reading device according to claim 1,
wherein the operation unit is disposed between the base and the reader.

3. The reading device according to claim 2,
wherein the first attachment frame supports the operation unit such that the operation unit is attached above the base with a distance therefrom, and
wherein the first cover includes a front cover component that is disposed to cover a space between the operation unit and the base from a front side of the reading device.

4. The reading device according to claim 3,
wherein the first cover includes an intermediate cover component disposed to cover a space between the operation unit and the first attachment frame such that the intermediate cover component surrounds the rear surface of the operation unit from an upper side and left and right sides.

5. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 4.

6. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 3.

7. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 2.

8. The reading device according to claim 1,
wherein the first attachment frame supports the operation unit such that the operation unit is attached above the base with a distance therefrom, and
wherein the first cover includes a front cover component that is disposed to cover a space between the operation unit and the base from a front side of the reading device.

9. The reading device according to claim 8,
wherein the first cover includes an intermediate cover component disposed to cover a space between the operation unit and the first attachment frame such that the intermediate cover component surrounds the rear surface of the operation unit from an upper side and left and right sides.

10. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 9.

11. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 8.

12. The reading device according to claim 1,
wherein the second attachment frame includes left and right second frames separately arranged at the left and right sides with respect to the first attachment frame.

13. The reading device according to claim 12,
wherein the first attachment frame and the second attachment frame are arranged in a state where the first attachment frame and the second attachment frame are not in contact with each other.

14. The reading device according to claim 13, further comprising:
a second cover that covers the first attachment frame,
wherein the first cover is attached to the second attachment frame, and the second cover is attached to the first attachment frame.

15. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 14.

16. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 13.

17. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 12.

18. An image forming apparatus comprising:
a reading unit that reads a read target object placed on a base from above the base; and
an image forming unit that forms an image corresponding to image information possibly containing information read by the reading unit onto a recording medium,
wherein the reading unit includes the reading device according to claim 1.

19. A reading device comprising:
placement means on which a read target object is placed;
reading means for reading the read target object placed on the placement means;
first attachment means to which the reading means is attached such that the reading means is disposed above the placement means;
operation means to be operated by a user;
second attachment means to which a rear surface of the operation means is attached such that the operation means is disposed in front of the first attachment means in a direction toward a front surface of the reading device; and
first cover means for covering the second attachment means,
wherein the first cover means includes left and right rear cover components that are separately arranged at left and right sides of the first attachment means serving as a dividing line at the rear surface of the operation means and that cover at least a portion of the second attachment means.

* * * * *